United States Patent [19]
Ortyn et al.

[11] Patent Number: 5,654,535
[45] Date of Patent: Aug. 5, 1997

[54] CYTOLOGICAL SYSTEM AUTOFOCUS INTEGRITY CHECKING APPARATUS

[75] Inventors: William E. Ortyn, Devall; Jon W. Hayenga; Louis R. Piloco, both of Kent, all of Wash.

[73] Assignee: NeoPath, Inc., Redmond, Wash.

[21] Appl. No.: 666,748

[22] Filed: Jun. 19, 1996

Related U.S. Application Data

[62] Division of Ser. No. 309,130, Sep. 20, 1994, Pat. No. 5,557,097.

[51] Int. Cl.⁶ .............................. G02B 7/28; H04N 7/18; G01M 11/02
[52] U.S. Cl. ..................... 250/201.3; 250/201.4; 348/79; 364/525; 364/551.01; 364/553
[58] Field of Search ............... 250/201.3, 201.4, 250/201.6, 201.2, 201.7, 201.8, 208.1, 559.33; 364/525, 553, 572, 574, 580, 551.01; 348/79, 92, 94, 95; 356/73, 435, 443

[56] References Cited

U.S. PATENT DOCUMENTS

| | | | |
|---|---|---|---|
| 4,019,819 | 4/1977 | Lodzinski | 356/73 |
| 4,159,874 | 7/1979 | Dearth et al. | 356/73 |
| 4,200,934 | 4/1980 | Hofmann | 364/571 |
| 4,239,395 | 12/1980 | Modisette | 356/443 |
| 4,287,532 | 9/1981 | Moore | 358/107 |
| 4,288,160 | 9/1981 | Lodzinski | 356/73 |
| 4,423,934 | 1/1984 | Lambeth et al. | 354/412 |
| 4,557,599 | 12/1985 | Zimring | 356/243 |
| 4,666,307 | 5/1987 | Matsumoto et al. | 364/525 |
| 5,117,110 | 5/1992 | Yasutake | 250/306 |
| 5,153,745 | 10/1992 | Brandkamp et al. | 358/406 |
| 5,257,060 | 10/1993 | Kotani et al. | 354/402 |
| 5,315,700 | 5/1994 | Johnston et al. | 395/163 |
| 5,444,481 | 8/1995 | Ohsima et al. | 348/94 |
| 5,502,654 | 3/1996 | Sawahata | 364/525 |
| 5,557,097 | 9/1996 | Ortyn et al. | 250/201.3 |

*Primary Examiner*—Edward P. Westin
*Assistant Examiner*—John R. Lee
*Attorney, Agent, or Firm*—Hans I. Sun; Emil Moffa

[57] ABSTRACT

An automated method for checking cytological system autofocus integrity. The automated method includes the steps of checking focus illumination integrity, checking focus camera Modulation Transfer Function, checking focus camera position integrity, and checking closed loop accuracy. Checking focus illumination integrity includes checking focus illumination system integrity, and checking a focus noise floor level. Checking focus camera position integrity includes checking focus camera longitudinal separation, and checking focus camera lateral separation. Checking focus camera position integrity includes checking focus filter frequency response.

6 Claims, 21 Drawing Sheets

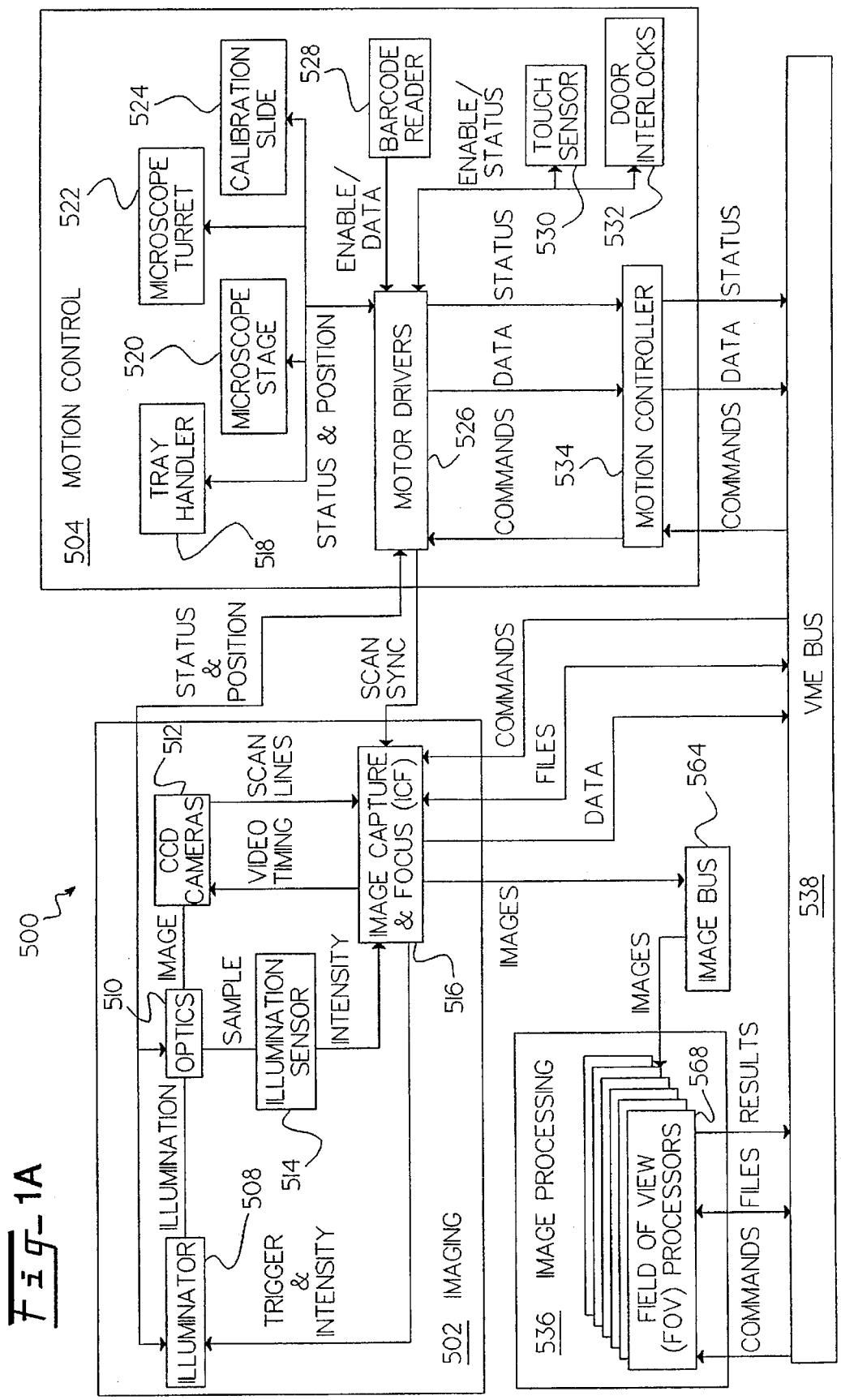

Fig_9

CYTOLOGICAL SYSTEM AUTOFOCUS INTEGRITY CHECKING APPARATUS

This application is a divisional of pending application Ser. No. 08/309,130, filed Sep. 20, 1994, now U.S. Pat. No. 5,557,097.

The present invention relates to a method for evaluation of autofocus integrity in automated machine vision instruments. More specifically, in one embodiment of the invention, the evaluation may be conducted for an autofocus system to determine illumination quality, noise floor level, focus filter frequency response, focus camera modulation transfer function (MTF), focus camera longitudinal separation, focus camera lateral and angular alignment, and closed loop accuracy in an instrument performing automated cytological analysis.

BACKGROUND OF THE INVENTION

Automated analysis of biological specimens is typically carried out by a computer controlled system having an automated microscope with an autofocus system. Such automated systems require a high degree of performance and consistency from the autofocus system. Image processing analyses of biological specimens use various segmentation algorithms and morphological operations that depend on consistent imagery for accurate and repeatable results. The autofocus system must provide consistent imagery by providing a suitably high quality focus to yield images of clinical value. Accordingly, the focus system must be checked frequently during operation of such analysis systems to ensure highly consistent and accurate performance. It is one motivation of this disclosure to provide techniques and apparatus for characterizing an autofocus system during operation.

SUMMARY OF THE INVENTION

The present invention provides an automated method for checking cytological system autofocus integrity. The automated method includes the steps of checking focus illumination integrity, checking focus camera Modulation Transfer Function (MTF), checking focus camera position integrity, and checking closed loop accuracy. Checking focus illumination integrity includes checking focus illumination system integrity, and checking a focus noise floor level. Checking focus camera position integrity includes checking focus camera longitudinal separation, and checking focus camera lateral separation. Checking focus camera position integrity includes checking focus filter frequency response.

It is one object of the invention to provide a means to characterize focus illumination quality in an automated machine vision instrument.

It is another object of the invention to provide a means to measure noise in an autofocus system using an above and below focus method in an automated machine vision instrument.

It is yet a further object of the invention to provide a means to measure the frequency response of focus filters utilized in an above below camera focus system in an automated machine vision instrument.

It is still a further object of the invention to provide a means to characterize any longitudinal separation between the cameras used in an above below camera focus method in an automated machine vision instrument.

It is yet a further object of this invention to provide a means to characterize any misalignment, both laterally and angularly between two cameras used in an above and below camera autofocus method in an automated machine vision instrument.

It is still a further object of this invention to provide a means to characterize the MTF of the cameras used in a two camera above and below focusing method in an automated machine vision instrument.

It is yet another object of this invention to provide a means to characterize the accuracy of the above and below camera focus method by comparison with an independent z-pan autofocus method in an automated machine vision instrument.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A and 1B show an automated cytology system as contemplated by the method and apparatus of the invention.

DETAILED DESCRIPTION OF THE PREFERRED EMBODIMENT

Figure 1B:
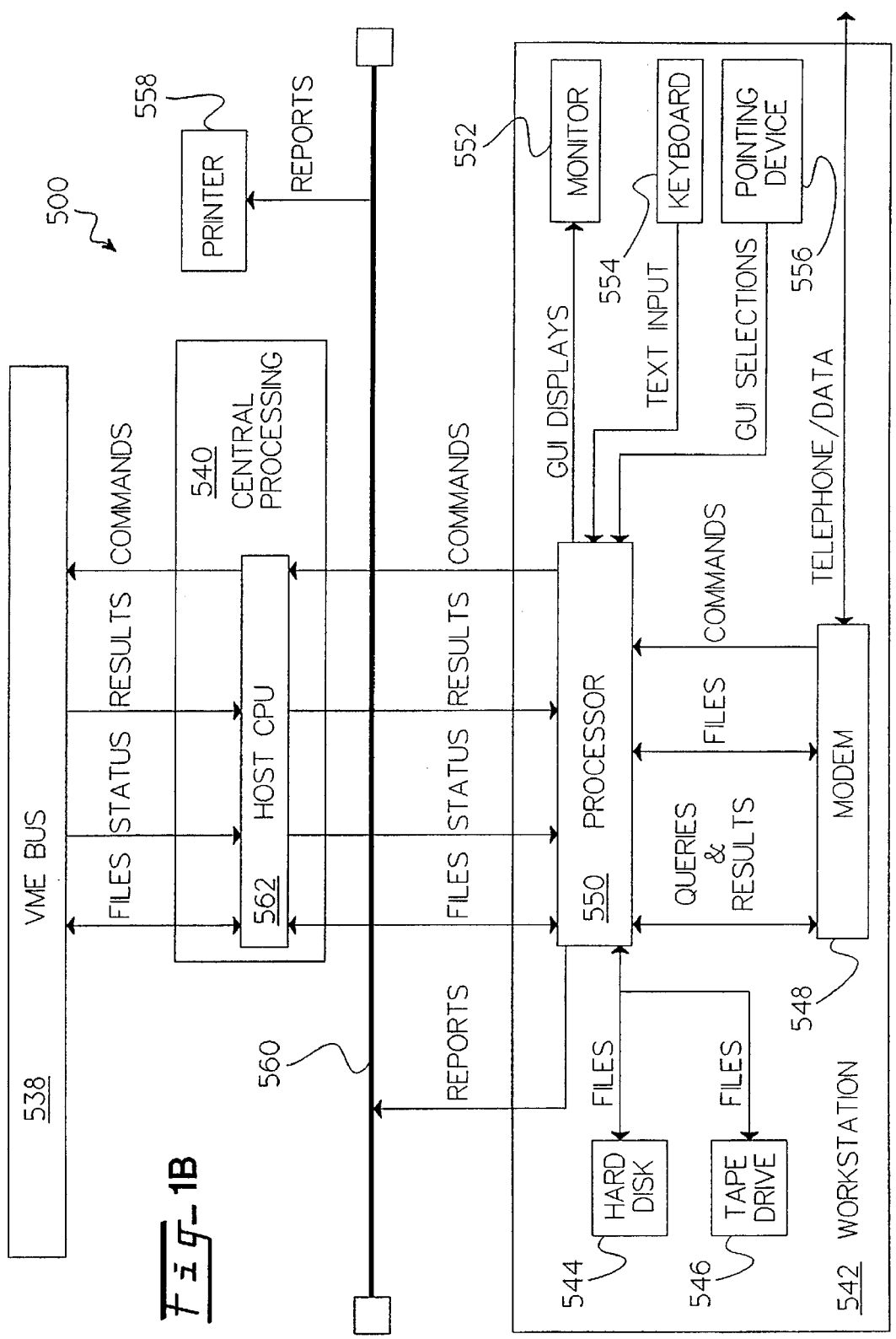

This invention consists of a suite of tests and a parameter monitoring method for characterizing focus illumination quality, noise floor level, focus filter frequency response, focus camera modulation transfer function, focus camera longitudinal separation, focus camera lateral and angular alignment and closed loop accuracy of an autofocus system as used in an automated machine vision instrument. The examples of tests discussed herein refer specifically by way of example to a system with a pulsed arc lamp and CCD imaging devices for primary and at least two autofocus cameras. The focus apparatus in a preferred embodiment uses an above and below focus camera frequency balancing method to determine the magnitude and direction to move to best focus. In addition, the images are passed through a set of focus filters to optimize performance for biological nuclear detail. The specifics of one example of a focus system are outlined in "Method and Apparatus For Rapid Capture of Focused Microscopic Images" by Jon Hayenga, et al., discussed further hereinbelow and incorporated herein by reference. However, the invention is not considered to be limited to the specific examples set forth herein. The concepts contained herein may be employed to other focus systems using continuous arc lamps, filament lamps, LASER sources, tube cameras, TDI sensors, PIN diodes and photomultiplier tubes.

In a presently preferred embodiment of the invention, the camera system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed Feb. 18, 1992, entitled "Method and Apparatus for Dynamic Correction of Microscopic Image Signals" by Jon W. Hayenga, et al.; and U.S. patent application attorney's docket No. 9/1799, filed Sep. 7, 1994 entitled "Method and Apparatus for Rapid Capture of Focused Microscopic Images" to Hayenga, et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including attorney docket No. 11b/1801, to Ortyn et al., entitled "CYTOLOGICAL SYSTEM ILLUMINATION INTEGRITY CHECKING APPARATUS AND METHOD," attorney docket No. 11c/1802, to Ortyn et al., entitled "CYTOLOGICAL SYSTEM IMAGE COLLECTION INTEGRITY CHECKING APPARATUS," attorney docket No. 11d/1803, to Ortyn et al., entitled "CYTOLOGICAL SYSTEM AUTOFOCUS INTEGRITY CHECKING APPARATUS," attorney docket No. 11e/1804, to Ortyn et al., entitled "AUTOMATED CYTOLOGY SYSTEM POSITION INTEGRITY CHECKING METHOD AND APPARATUS," attorney docket No. 11a/1800, to Ortyn et al., entitled "BIOLOGICAL SPECIMEN ANALYSIS SYSTEM PROCESSING INTEGRITY CHECKING APPARATUS."

Now refer to FIGS. 1A and 1B which show a schematic diagram of one embodiment of the apparatus of the invention for checking system autofocus integrity for an automated machine vision system. While the method and apparatus of the invention will be discussed in terms of an example herein related to an automated cytology apparatus, it will be understood that the invention is not so limited. The features and principles of the invention may be applied to check urine analysis processes, semiconductor process defects, liquid crystal devices and other types of processing systems employing, for example, continuous arc lamps, filament lamps, laser sources, tube cameras, PIN diodes and photomultiplier tubes.

The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope turret controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540.

An Ethernet (TM) communication system 560 communicates to a workstation 542 to provide control of the system. A hard disk 544 is controlled by workstation processor 550. In one embodiment, workstation 542 may comprise a Sun SPARC Classic (TM) workstation. A tape drive 546 is connected to the workstation processor 550 as well as a modem 548, a monitor 552, a keyboard 554, and a mouse pointing device 556. A printer 558 is connected to the Ethernet (TM) network 560.

During system focus integrity checking, the central computer 540, running a real time operating system, controls the automated microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

It is to be understood that the various processes described hereinabove with respect to checking illumination quality, noise floor level, focus filter frequency response, focus camera modulation transfer function, focus camera longitudinal separation, focus camera lateral and angular alignment, and closed loop accuracy in an instrument performing automated cytological analysis may be implemented in software suitable for running on a digital processor or computer. The software may be embedded, for example, in the central processor 540.

Figure 2:
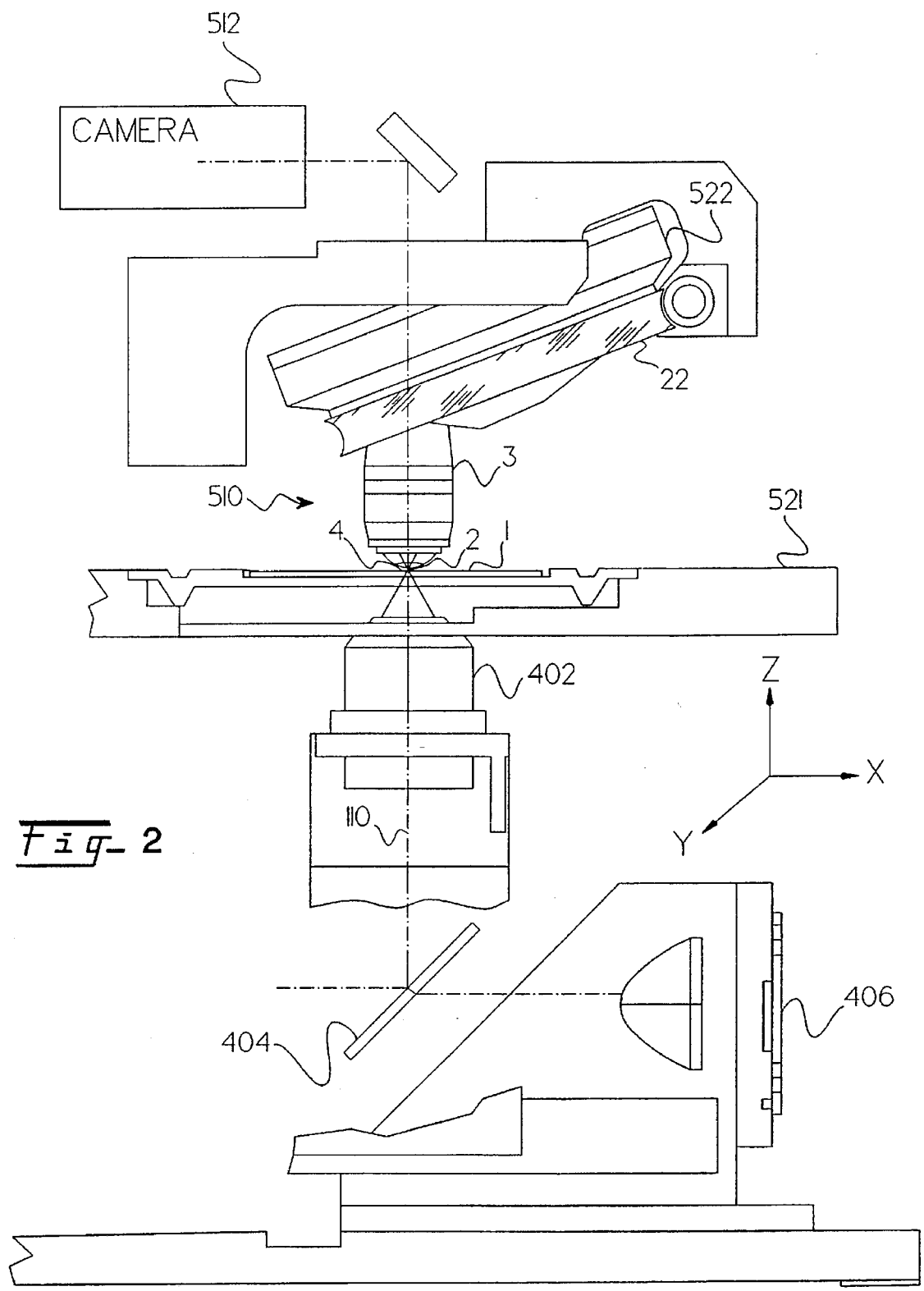
FIG. 2 schematically shows an automated microscope of the type used in automated cytological system having a calibration plate mounted on a movable stage.

Referring now to FIG. 2, there shown is placement of a calibration and test target 1 into an optical path of an automated microscope 3 having a turret 22. The calibration and test target may be mounted on a stage 521 substantially in a horizontal X,Y plane which intersects the optical path. The stage 21 is movable in the X,Y plane as well as along a Z axis which is perpendicular to the X,Y plane and which is parallel to the optical axis of the automated microscope. The turret 22 may comprise multiple objective lenses as is well known in the art. The microscope turret control 522 provides signals in a well known manner for positioning a selected objective lens into position for viewing a slide, for example.

Figure 3:
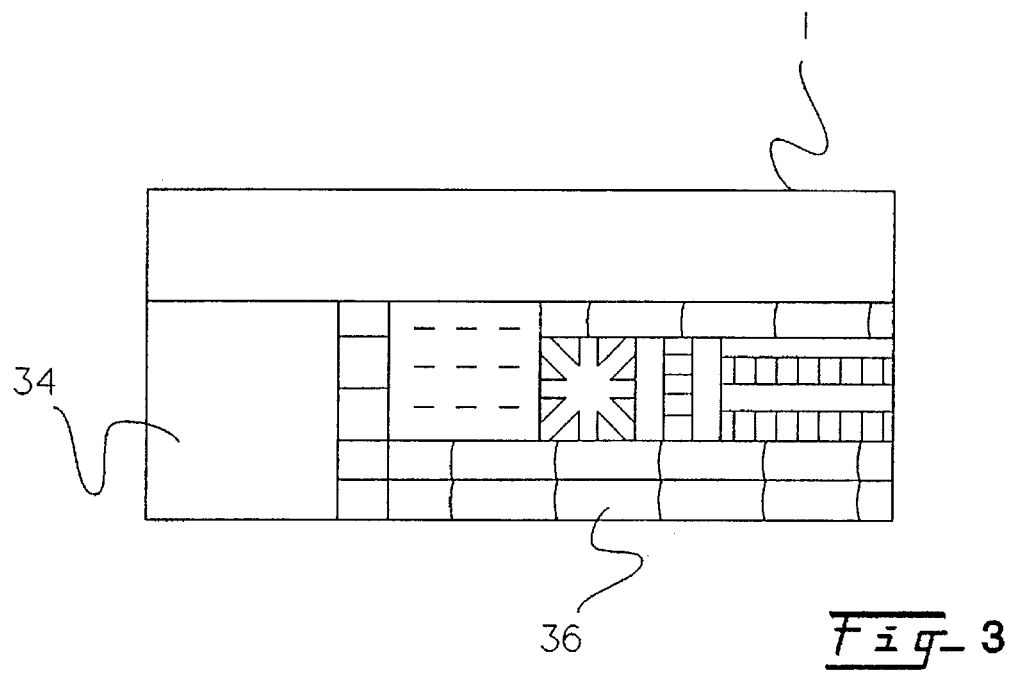
FIG. 3 shows one example of a calibration and test target or plate as used in one aspect of the invention.
Figure 4:
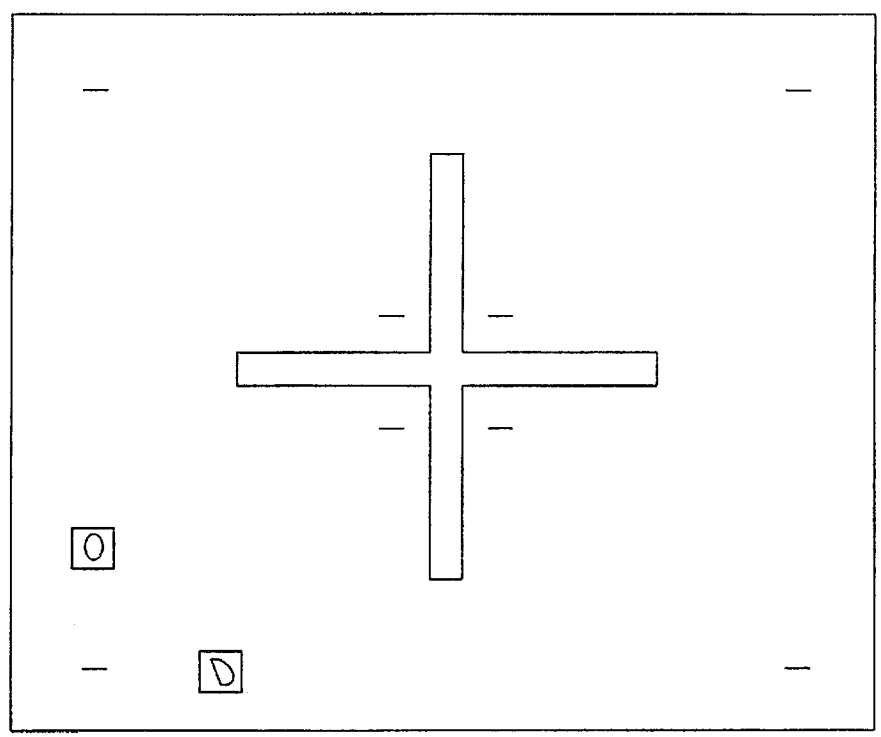
FIG. 4 shows an example of a fiducial marking.

Referring now to FIG. 3 one example of a calibration and test target is shown. Several of the processes employed by the present invention require a calibration and target plate. In the case of a transmission microscope, the calibration and test target 1 may comprise a piece of glass approximately 1.45 mm thick. The calibration and test target advantageously comprises specified clear areas 34 and image primitives such as horizontal and vertical bar targets 36. The clear area simulates a microscope slide. The clear areas are used herein for illumination and noise quality tests. The image primitives are used for frequency response and position testing. Other types of calibration markings, such as fiducial markings, may also be used. FIG. 4 shows an example of a fiducial marking. Such calibration and test target plates may be used for most transmission microscopes to simulate the optical path difference effects introduced by the substrate, coverslip and specimen media. In some embodiments of the invention, the calibration and test target may be advantageously mounted onto a conventional cantilever arm for ease of placement into the optical path in proximity to a position where a specimen would normally be positioned.

Focus System Illumination Quality

Figure 5:
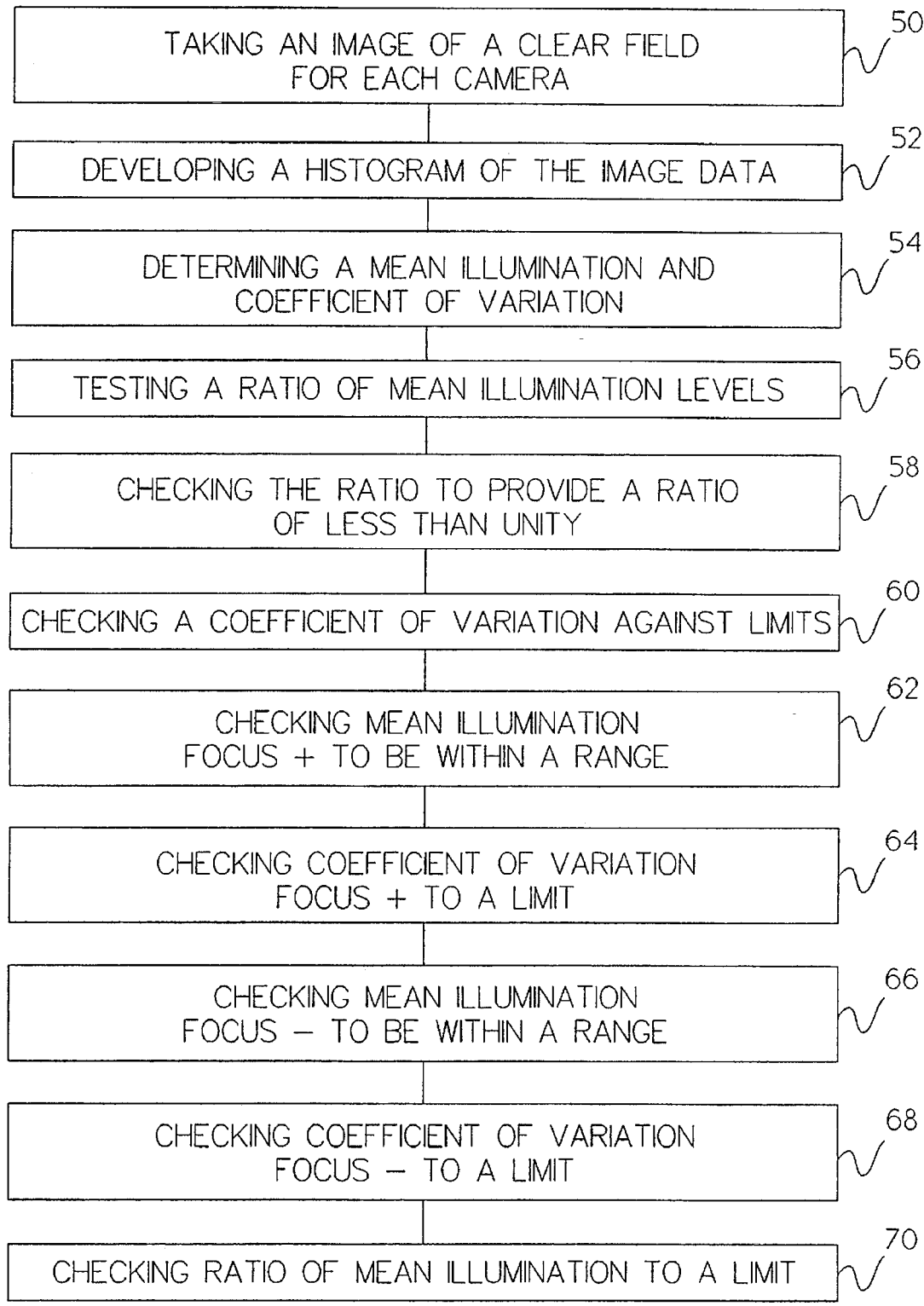
FIG. 5 shows a flow diagram of one method of the invention for checking focus system illumination quality.

Referring now to FIG. 5, FIG. 5 shows a flow diagram of the method of the invention for checking focus system illumination quality. Proper illumination at the focus cameras is needed for accurate focus of an automated biological specimen analysis system. An above and below autofocus method often determines the signal strength for each camera used in such a system and attempts to balance those signals. Such methods use at least two focus cameras. If the illumination level is different at each camera, there may be a discrepancy in signal strength even though the locus of the image presented to each camera may be identical. The invention provides a focus illumination test to be performed on each focus camera to check the illumination quality. The focus illumination test helps ensure that a signal presented to each camera is not influenced by any defect in illumination. At step 50, an image is taken of a clear field for each camera and, at step 52, a histogram is developed similar to that shown in Table 1. This histogram provides intensity values of the entire field for a focus and camera. From the histogram the mean illumination and coefficient of variation of the intensity of the field is determined for each camera at step 54.

TABLE 1

Intensity Histogram of Entire Field For Focus + Camera

| Int # | Int # | Int # | Int # | Int # | Int # | Int # | Int # |
|---|---|---|---|---|---|---|---|
| 0:0 | 32:0 | 64:0 | 96:0 | 128:0 | 160:0 | 192:0 | 224:2 |
| 1:0 | 33:0 | 65:0 | 97:0 | 129:0 | 161:0 | 193:0 | 225:7 |
| 2:0 | 34:0 | 66:0 | 98:0 | 130:0 | 162:0 | 194:0 | 226:213 |
| 3:0 | 35:0 | 67:0 | 99:0 | 131:0 | 163:0 | 195:0 | 227:1424 |
| 4:0 | 36:0 | 68:0 | 100:0 | 132:0 | 164:0 | 196:0 | 228:7803 |
| 5:0 | 37:0 | 69:0 | 101:0 | 133:0 | 165:0 | 197:0 | 229:47942 |
| 6:0 | 38:0 | 70:0 | 102:0 | 134:0 | 166:0 | 198:0 | 230:60366 |
| 7:0 | 39:0 | 71:0 | 103:0 | 135:0 | 167:0 | 199:0 | 231:74350 |
| 8:0 | 40:0 | 72:0 | 104:0 | 136:0 | 168:0 | 200:0 | 232:51837 |
| 9:0 | 41:0 | 73:0 | 105:0 | 137:0 | 169:0 | 201:0 | 233:15630 |
| 10:0 | 42:0 | 74:0 | 106:0 | 138:0 | 170:0 | 202:0 | 234:2231 |
| 11:0 | 43:0 | 75:0 | 107:0 | 139:0 | 171:0 | 203:0 | 235:317 |
| 12:0 | 44:0 | 76:0 | 108:0 | 140:0 | 172:0 | 204:0 | 236:22 |
| 13:0 | 45:0 | 77:0 | 109:0 | 141:0 | 173:0 | 205:0 | 237:0 |
| 14:0 | 46:0 | 78:0 | 110:0 | 142:0 | 174:0 | 206:0 | 238:0 |
| 15:0 | 47:0 | 79:0 | 111:0 | 143:0 | 175:0 | 207:0 | 239:0 |
| 16:0 | 48:0 | 80:0 | 112:0 | 144:0 | 176:0 | 208:0 | 240:0 |
| 17:0 | 49:0 | 81:0 | 113:0 | 145:0 | 177:0 | 209:0 | 241:0 |
| 18:0 | 50:0 | 82:0 | 114:0 | 146:0 | 178:0 | 210:0 | 242:0 |
| 19:0 | 51:0 | 83:0 | 115:0 | 147:0 | 179:0 | 211:0 | 243:0 |
| 20:0 | 52:0 | 84:0 | 116:0 | 148:0 | 180:0 | 212:0 | 244:0 |
| 21:0 | 53:0 | 85:0 | 117:0 | 149:0 | 181:0 | 213:0 | 245:0 |
| 22:0 | 54:0 | 86:0 | 118:0 | 150:0 | 182:0 | 214:0 | 246:0 |
| 23:0 | 55:0 | 87:0 | 119:0 | 151:0 | 183:0 | 215:0 | 247:0 |
| 24:0 | 56:0 | 88:0 | 120:0 | 152:0 | 184:0 | 216:0 | 248:0 |
| 25:0 | 57:0 | 89:0 | 121:0 | 153:0 | 185:0 | 217:0 | 249:0 |
| 26:0 | 58:0 | 90:0 | 122:0 | 154:0 | 186:0 | 218:0 | 250:0 |
| 27:0 | 59:0 | 91:0 | 123:0 | 155:0 | 187:0 | 219:0 | 251:0 |
| 28:0 | 60:0 | 92:0 | 124:0 | 156:0 | 188:0 | 220:0 | 252:0 |
| 29:0 | 61:0 | 93:0 | 125:0 | 157:0 | 189:0 | 221:0 | 253:0 |
| 30:0 | 62:0 | 94:0 | 126:0 | 158:0 | 190:0 | 222:0 | 254:0 |
| 31:0 | 63:0 | 95:0 | 127:0 | 159:0 | 191:0 | 223:0 | 255:0 |

TABLE 2

Intensity Histogram of Entire Field For Focus (−) Camera

| Int # | Int # | Int # | Int # | Int # | Int # | Int # | Int # |
|---|---|---|---|---|---|---|---|
| 0:0 | 32:0 | 64:0 | 96:0 | 128:0 | 160:0 | 192:0 | 224:0 |
| 1:0 | 33:0 | 65:0 | 97:0 | 129:0 | 161:0 | 193:0 | 225:0 |
| 2:0 | 34:0 | 66:0 | 98:0 | 130:0 | 162:0 | 194:0 | 226:0 |
| 3:0 | 35:0 | 67:0 | 99:0 | 131:0 | 163:0 | 195:0 | 227:0 |
| 4:0 | 36:0 | 68:0 | 100:0 | 132:0 | 164:0 | 196:0 | 228:1 |
| 5:0 | 37:0 | 69:0 | 101:0 | 133:0 | 165:0 | 197:0 | 229:0 |
| 6:0 | 38:0 | 70:0 | 102:0 | 134:0 | 166:0 | 198:0 | 230:214 |
| 7:0 | 39:0 | 71:0 | 103:0 | 135:0 | 167:0 | 199:0 | 231:404 |
| 8:0 | 40:0 | 72:0 | 104:0 | 136:0 | 168:0 | 200:0 | 232:6823 |
| 9:0 | 41:0 | 73:0 | 105:0 | 137:0 | 169:0 | 201:0 | 233:8942 |

TABLE 2-continued

Intensity Histogram of Entire Field For Focus (−) Camera

| Int # | Int # | Int # | Int # | Int # | Int # | Int # | Int # |
|---|---|---|---|---|---|---|---|
| 10:0 | 42:0 | 74:0 | 106:0 | 138:0 | 170:0 | 202:0 | 234:62366 |
| 11:0 | 43:0 | 75:0 | 107:0 | 139:0 | 171:0 | 203:0 | 235:62350 |
| 12:0 | 44:0 | 76:0 | 108:0 | 140:0 | 172:0 | 204:0 | 236:61837 |
| 13:0 | 45:0 | 77:0 | 109:0 | 141:0 | 173:0 | 205:0 | 237:16630 |
| 14:0 | 46:0 | 78:0 | 110:0 | 142:0 | 174:0 | 206:0 | 238:1231 |
| 15:0 | 47:0 | 79:0 | 111:0 | 143:0 | 175:0 | 207:0 | 239:217 |
| 16:0 | 48:0 | 80:0 | 112:0 | 144:0 | 176:0 | 208:0 | 240:122 |
| 17:0 | 49:0 | 81:0 | 113:0 | 145:0 | 177:0 | 209:0 | 241:0 |
| 18:0 | 50:0 | 82:0 | 114:0 | 146:0 | 178:0 | 210:0 | 242:0 |
| 19:0 | 51:0 | 83:0 | 115:0 | 147:0 | 179:0 | 211:0 | 243:0 |
| 20:0 | 52:0 | 84:0 | 116:0 | 148:0 | 180:0 | 212:0 | 244:0 |
| 21:0 | 53.0 | 85:0 | 117:0 | 149:0 | 181:0 | 213:0 | 245:0 |
| 22:0 | 54:0 | 86:0 | 118:0 | 150:0 | 182:0 | 214:0 | 246:0 |
| 23:0 | 55:0 | 87:0 | 119:0 | 151:0 | 183:0 | 215:0 | 247:0 |
| 24:0 | 56:0 | 88:0 | 120:0 | 152:0 | 184:0 | 216:0 | 248:0 |
| 25:0 | 57:0 | 89:0 | 121:0 | 153:0 | 185:0 | 217:0 | 249:0 |
| 26:0 | 58:0 | 90:0 | 122:0 | 154:0 | 186:0 | 218:0 | 250:0 |
| 27:0 | 59:0 | 91:0 | 123:0 | 155:0 | 187:0 | 219:0 | 251:0 |
| 28:0 | 60:0 | 92:0 | 124:0 | 156:0 | 188:0 | 220:0 | 252:0 |
| 29:0 | 61:0 | 93:0 | 125:0 | 157:0 | 189:0 | 221:0 | 253:0 |
| 30:0 | 62:0 | 94:0 | 126:0 | 158:0 | 190:0 | 222:0 | 254:0 |
| 31:0 | 63:0 | 95:0 | 127:0 | 159:0 | 191:0 | 223:0 | 255:0 |

The ratio of mean illumination levels is tested along with the absolute value of the means at step 56. The ratio is, checked and inverted if necessary to provide a ratio of less than unity. This allows for one limit to be set for the ratio. The coefficient of variation for each camera is also checked against limits at step 60. Limits are seen below in Table 3.

At step 62, the mean illumination focus+ is checked to be within a certain tolerance range. At step 64, the coefficient of variation of the focus+ camera is checked against a predetermined limit. At step 66, the mean illumination of the focus plus camera is checked to be within a predetermined range of values. At step 68 the coefficient of variation of the focus+camera is checked against a predetermined limit. Similarly, at step 70, the ratio of beam illumination is checked against a predetermined limit.

TABLE 3

Parameter Results and Limits Comparison for Static Field Uniformity

| Parameter Description | Actual Value | Limits |
|---|---|---|
| Mean Illumination Focus (+) | 231 | 220 < x < 250 |
| Coefficient of variation Focus (+) | 0.6% | <1.0% |
| Mean Illumination Focus (+) | 235 | 220 < x < 250 |
| Coefficient of variation Focus (+) | 0.7% | <1.0% |
| Ratio of Mean Illumination | 0.98 | >0.97 |

Focus Noise Floor Level

Figure 6:
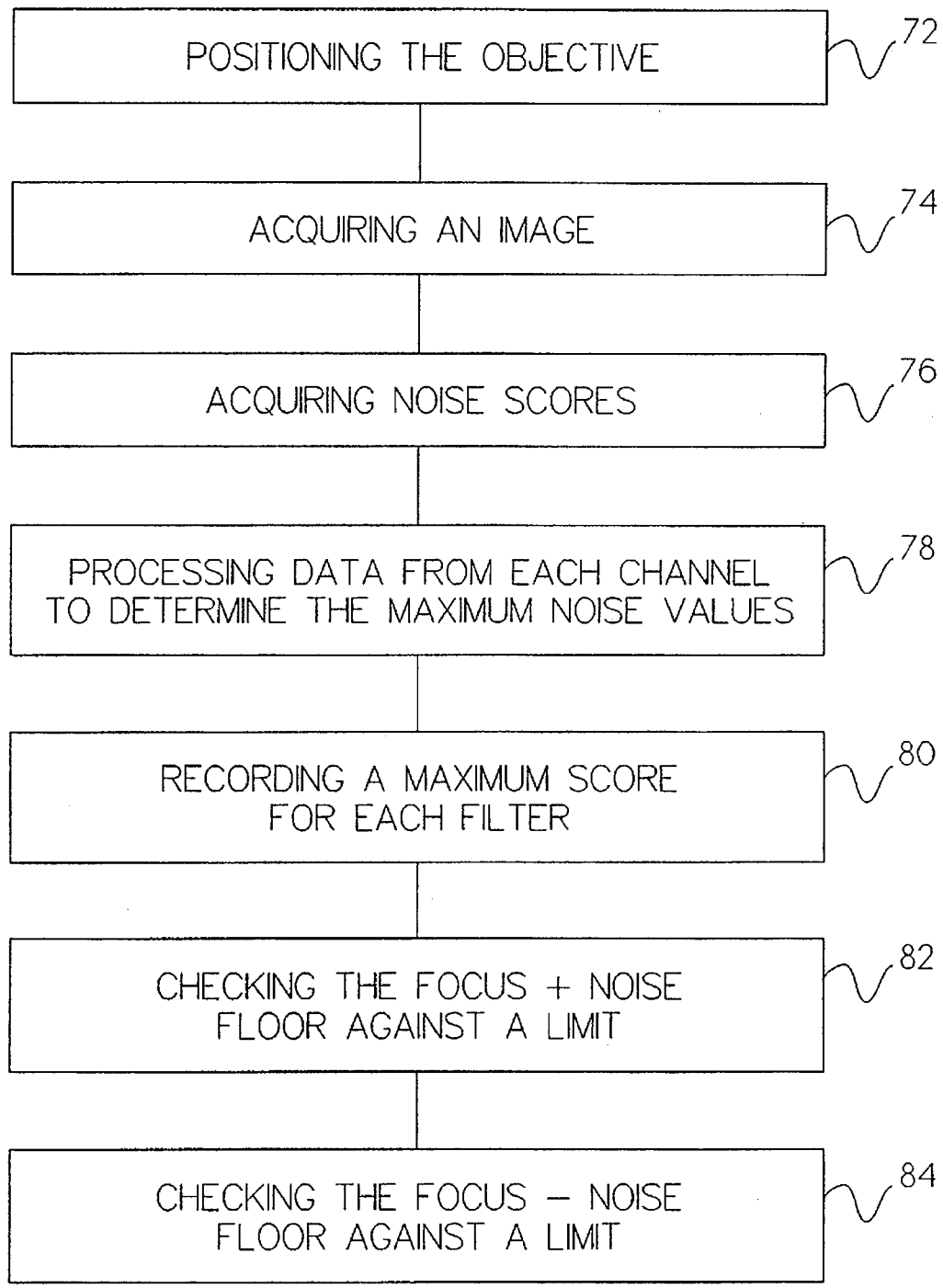
FIG. 6 shows a flow diagram of one method of the invention for checking focus noise floor level.
Figure 15:
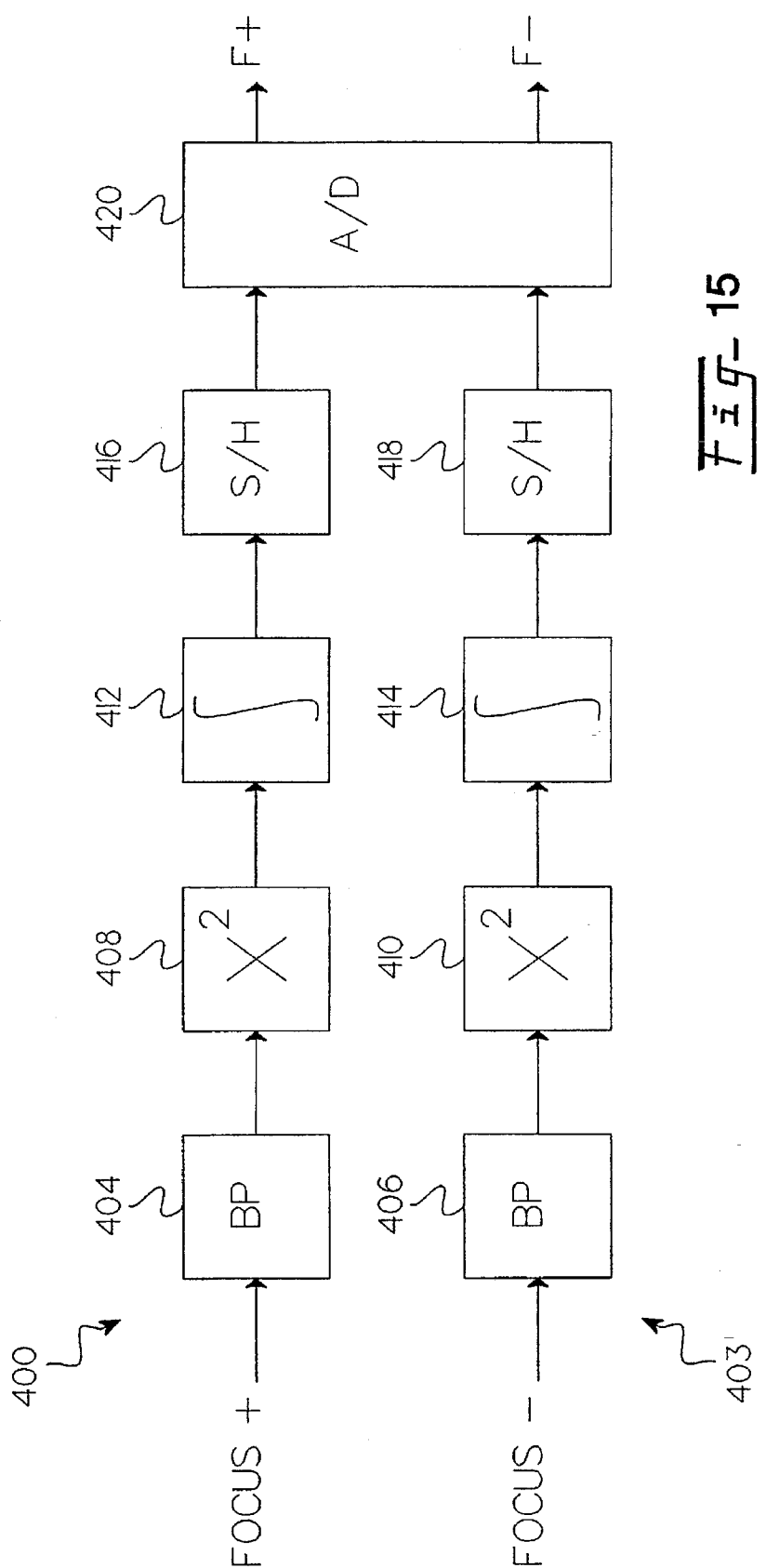
FIG. 15 is an illustrative diagram of a circuit for determining the focus position of the camera assembly of FIG. 14 in accordance with an alternate focussing procedure.

Now referring to FIG. 6, a flow diagram of the invention for checking focus noise floor level is shown. The above and below focus method being tested in accordance with the invention uses focus filters for each camera as shown in FIG. 15. The focus filters are electronic filters which optimize signals delivered from the cameras for focus processing by filtering out objects that do not have the characteristic frequency content of cellular nuclei. Filtering techniques are described in more detail below. Debris in the focus paths and electronic noise may generate erroneous focus projections. Theoretically, the response of the focus filters should be zero over a uniformly illuminated clear field of view. In actuality, however, the response of the filters to this type of stimulus is rarely, if ever, zero. Electronic noise, debris in the focus path, and focus filter inefficiencies can and do result in some response at the output. This response is referred to as the "focus noise floor level." Specifically, the focus noise floor level is the response of the focus filters to a uniformly illuminated clear field. One aspect of the invention provides a test for measuring the amplitude of filter response under this condition. In addition, since the above and below focus method employed generates a focus filter data point for each active line in the video timing, in one example, a total of 512 focus noise floor levels are captured and analyzed for the focus plus and focus minus response. A focus noise floor test is performed on each focus camera to ensure proper operation.

At step 72, a selected objective is positioned over the nominal clear area of the calibration plate with, for example, a 20× magnification selected. An image is acquired at step 74 and at step 76 noise scores for each line of the plus and minus focus filters are acquired. Data acquired from each channel is processed to determine the maximum noise values for each channel at step 78. The maximum score for each filter is then recorded as the focus noise floor at step 80. At step 82 the focus plus noise floor is checked against a predetermined limit. The focus minus noise floor is also checked at step 84. Examples of focus noise floor limits are shown below.

Limits

Figure 7:
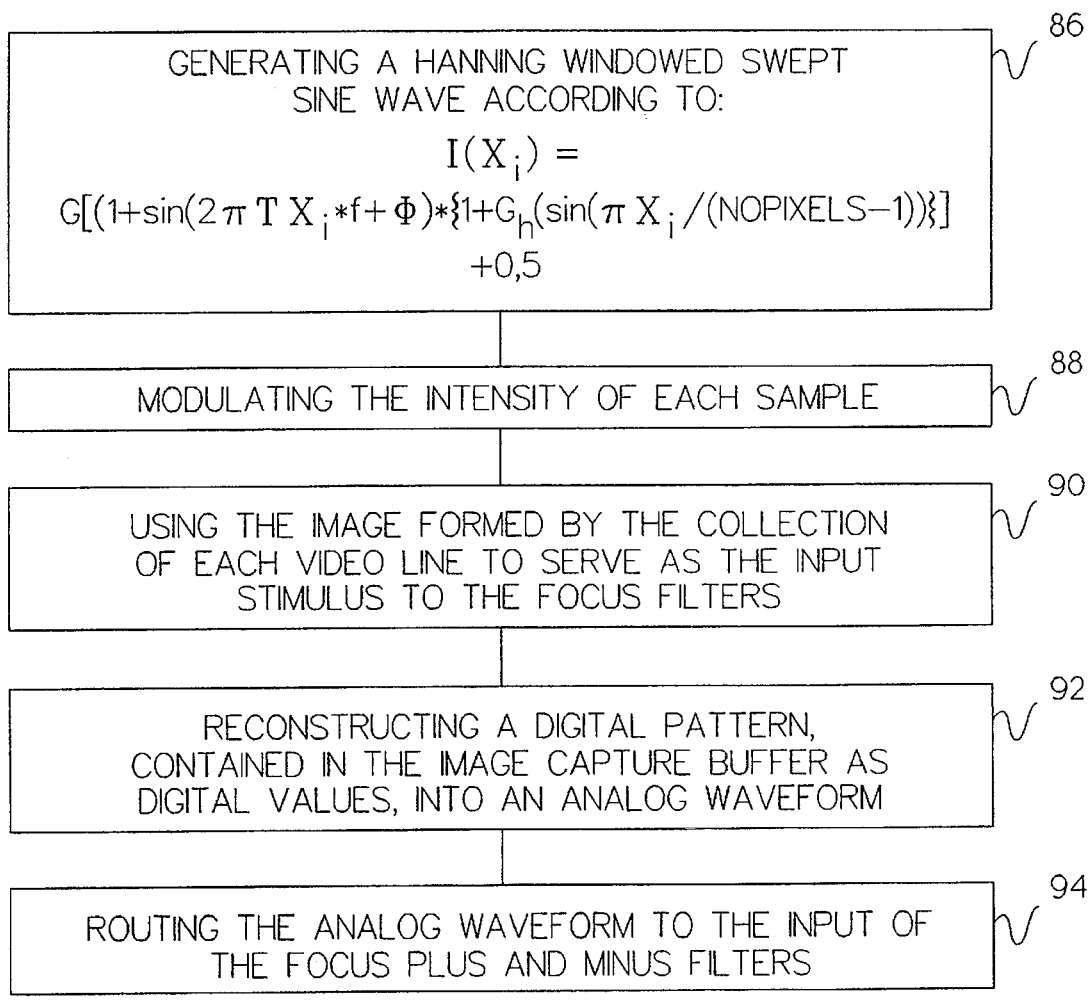
FIG. 7 shows a flow diagram of one method of the invention for checking focus filter frequency response.

Focus+noise floor: <10 counts
Focus−noise floor: <10 counts
Focus Filter Frequency Response Now referring to FIG. 7, a schematic flow diagram of one method for checking focus filter frequency response is shown. The electronic band-pass filters discussed below, utilized by the focus channels are optimized for maximum sensitivity in the frequency range characteristic to that of cellular nuclei. To determine the focus projection of "best clinical value" these filters must perform appropriately in both the stop and pass bands. The bandpass is chosen to heavily weigh frequencies which are generated by cellular nuclei when imaged at a defocus of about four microns. Four microns is, in one embodiment, the nominal separation of the focus and primary cameras. Poorly adjusted, or malfunctioning, focus filters my severely skew the focus projection value. It is necessary, therefore, to accurately quantify the performance o the filters to ensure proper operation of the focus subsystem. The focus filter frequency response test of the invention provides the means for evaluating filter efficacy by evaluating its output response to that of a known test pattern. It is advantageous to perform this test prior to running a batch of slides for analysis.

At step 86, a Hanning windowed swept sine wave is electronically generated from 50 kHz to 2.2 MHz. in the ICF image buffer according to the expression:

$$I(X_i)=G[(1+\sin(2\pi TX_i \cdot f + \phi) \cdot \{1+G_h(\sin(\pi X_i/(\text{NoPixels}-1))\}]+0.5$$

Where:

$I(X_i)$=The intensity or amplitude of the ith pixel.
$X_i$=The horizontal position index of the ith pixel or sample. From 0 through 511 samples.
$\phi$=The phase term for each sample. Typically 0 radians.
G=Intensity gain factor.
$G_h$=Hanning gain factor.
NoPixels=Total number of pixels or samples.

At step 88 it is indicated that the intensity of each sample, I(xi) is modulated according to the expression given above.

At step 90, the image formed by the collection of each video line then serves as the input stimulus to the focus filters. This pattern, contained in the image capture buffer (ICF) 516 as digital values, is then reconstructed into an analog waveform by routing it through an on board D/A converter at step 92. The analog waveform is then routed to the input of the focus plus and minus filters providing them necessary stimulus for characterizing the overall output response at step 94.

Figure 8:
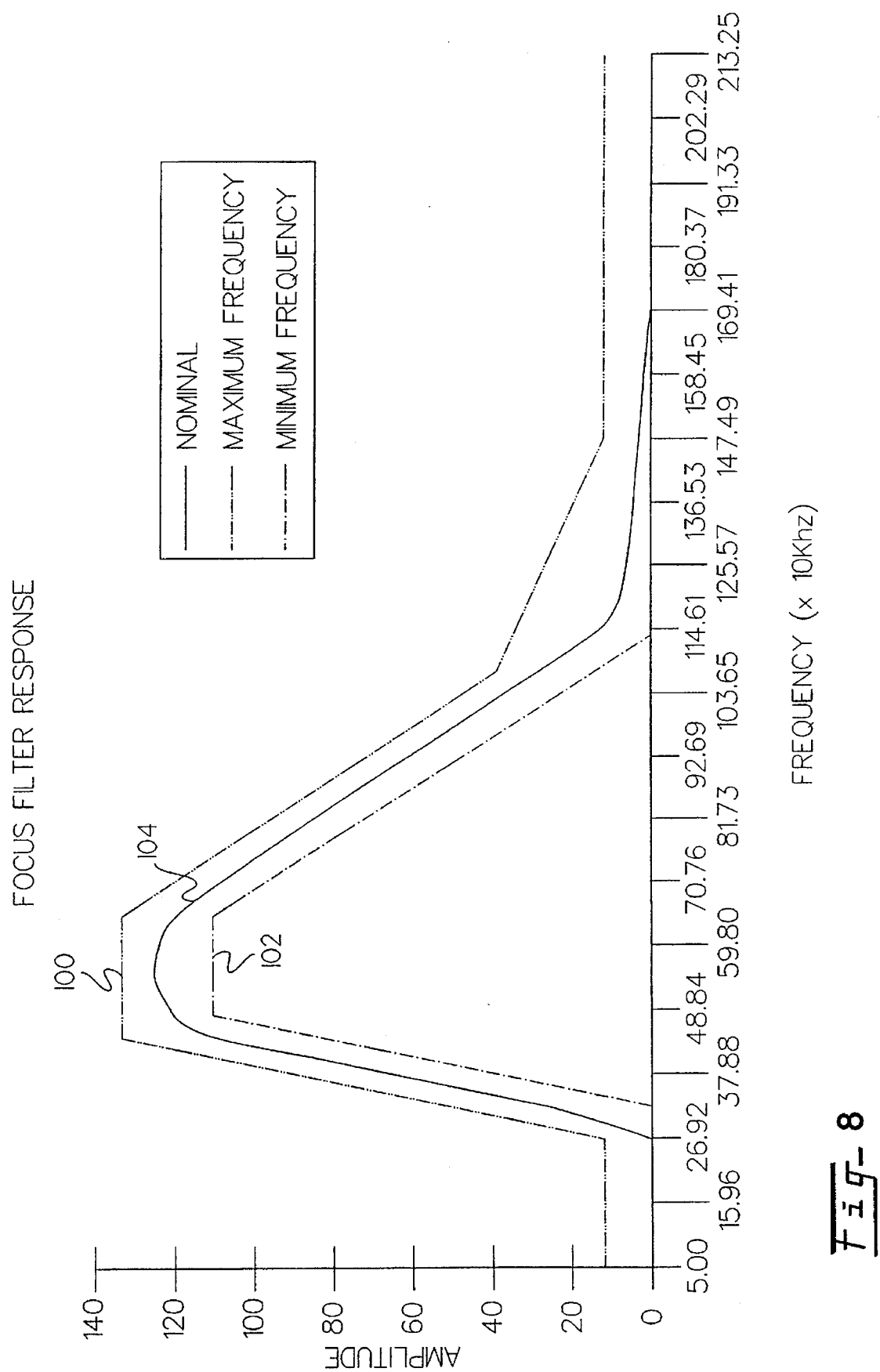
FIG. 8 shows a graph of focus filter response.

Response limits have been empirically determined for a machine manufactured by NeoPath, Inc. of Bellevue, Wash., U.S.A. called the AP300 System. The empirically derived limits represent the maximum and minimum allowable output variation for the filters. To ensure proper operation of the Focus System, the AP300 machine evaluates the response of the focus filters when initially processing of each new tray of slides. FIG. 8 illustrates the filter response envelope, the upper and lower curves, 100 and 102 respectively, represent the maximum and minimum limits. The middle curve 104 represents a typical response for a normally functioning filter. Table 5, contains an example of limits used for evaluating filter response. Bin 0, corresponds to the starting frequency of the test pattern (50 Khz). Bin 255 corresponds to the ending frequency of the test pattern (2.2 Mhz).

TABLE 5

Intensity Histogram of Entire Field For Focus + Camera

| Bin | Min | Max | Bin | Min | Max | Bin | Min | Max | Bin | Min | Max |
|---|---|---|---|---|---|---|---|---|---|---|---|
| 0 | 0 | 12 | 64 | 110 | 133 | 128 | 0 | 34 | 192 | 0 | 13 |
| 1 | 0 | 12 | 65 | 110 | 133 | 129 | 0 | 34 | 193 | 0 | 13 |
| 2 | 0 | 12 | 66 | 110 | 133 | 130 | 0 | 33 | 194 | 0 | 13 |
| 3 | 0 | 12 | 67 | 110 | 133 | 131 | 0 | 33 | 195 | 0 | 13 |
| 4 | 0 | 12 | 68 | 110 | 133 | 132 | 0 | 32 | 196 | 0 | 13 |
| 5 | 0 | 12 | 69 | 110 | 133 | 133 | 0 | 32 | 197 | 0 | 13 |
| 6 | 0 | 12 | 70 | 110 | 133 | 134 | 0 | 31 | 198 | 0 | 13 |
| 7 | 0 | 12 | 71 | 110 | 133 | 135 | 0 | 31 | 199 | 0 | 13 |
| 8 | 0 | 12 | 72 | 110 | 133 | 136 | 0 | 30 | 200 | 0 | 13 |
| 9 | 0 | 12 | 73 | 108 | 131 | 137 | 0 | 30 | 201 | 0 | 13 |
| 10 | 0 | 12 | 74 | 106 | 129 | 138 | 0 | 29 | 202 | 0 | 13 |
| 11 | 0 | 12 | 75 | 104 | 127 | 139 | 0 | 29 | 203 | 0 | 13 |
| 12 | 0 | 12 | 76 | 102 | 125 | 140 | 0 | 28 | 204 | 0 | 13 |
| 13 | 0 | 12 | 77 | 100 | 123 | 141 | 0 | 28 | 205 | 0 | 13 |
| 14 | 0 | 12 | 78 | 98 | 121 | 142 | 0 | 27 | 206 | 0 | 13 |
| 15 | 0 | 12 | 79 | 96 | 119 | 143 | 0 | 27 | 207 | 0 | 13 |
| 16 | 0 | 12 | 80 | 94 | 117 | 144 | 0 | 26 | 208 | 0 | 13 |
| 17 | 0 | 12 | 81 | 92 | 115 | 145 | 0 | 25 | 209 | 0 | 13 |
| 18 | 0 | 12 | 82 | 90 | 113 | 146 | 0 | 25 | 210 | 0 | 13 |
| 19 | 0 | 12 | 83 | 88 | 111 | 147 | 0 | 24 | 211 | 0 | 13 |
| 20 | 0 | 12 | 84 | 86 | 109 | 148 | 0 | 24 | 212 | 0 | 13 |
| 21 | 0 | 12 | 85 | 84 | 107 | 149 | 0 | 23 | 213 | 0 | 13 |
| 22 | 0 | 12 | 86 | 82 | 105 | 150 | 0 | 23 | 214 | 0 | 13 |
| 23 | 0 | 12 | 87 | 80 | 103 | 151 | 0 | 22 | 215 | 0 | 13 |
| 24 | 0 | 12 | 88 | 78 | 101 | 152 | 0 | 22 | 216 | 0 | 13 |
| 25 | 0 | 12 | 89 | 76 | 99 | 153 | 0 | 21 | 217 | 0 | 13 |
| 26 | 0 | 12 | 90 | 74 | 97 | 154 | 0 | 21 | 218 | 0 | 13 |
| 27 | 0 | 18 | 91 | 72 | 95 | 155 | 0 | 20 | 219 | 0 | 13 |
| 28 | 0 | 23 | 92 | 70 | 93 | 156 | 0 | 20 | 220 | 0 | 13 |
| 29 | 0 | 29 | 93 | 68 | 91 | 157 | 0 | 19 | 221 | 0 | 13 |
| 30 | 0 | 34 | 94 | 66 | 89 | 158 | 0 | 19 | 222 | 0 | 13 |
| 31 | 0 | 40 | 95 | 64 | 87 | 159 | 0 | 18 | 223 | 0 | 13 |
| 32 | 0 | 45 | 96 | 62 | 85 | 160 | 0 | 18 | 224 | 0 | 13 |
| 33 | 0 | 51 | 97 | 60 | 83 | 161 | 0 | 17 | 225 | 0 | 13 |
| 34 | 0 | 56 | 98 | 58 | 81 | 162 | 0 | 17 | 226 | 0 | 13 |
| 35 | 0 | 62 | 99 | 56 | 79 | 163 | 0 | 16 | 227 | 0 | 13 |
| 36 | 0 | 67 | 100 | 54 | 77 | 164 | 0 | 16 | 228 | 0 | 13 |
| 37 | 0 | 73 | 101 | 52 | 75 | 165 | 0 | 15 | 229 | 0 | 13 |
| 38 | 0 | 78 | 102 | 50 | 73 | 166 | 0 | 15 | 230 | 0 | 13 |
| 39 | 0 | 84 | 103 | 48 | 71 | 167 | 0 | 14 | 231 | 0 | 13 |
| 40 | 43 | 89 | 104 | 46 | 69 | 168 | 0 | 14 | 232 | 0 | 13 |
| 41 | 49 | 95 | 105 | 44 | 67 | 169 | 0 | 13 | 233 | 0 | 13 |
| 42 | 55 | 100 | 106 | 42 | 65 | 170 | 0 | 13 | 234 | 0 | 13 |
| 43 | 61 | 106 | 107 | 40 | 63 | 171 | 0 | 13 | 235 | 0 | 13 |
| 44 | 67 | 111 | 108 | 38 | 61 | 172 | 0 | 13 | 236 | 0 | 13 |
| 45 | 73 | 117 | 109 | 36 | 59 | 173 | 0 | 13 | 237 | 0 | 13 |
| 46 | 79 | 122 | 110 | 34 | 57 | 174 | 0 | 13 | 238 | 0 | 13 |
| 47 | 86 | 128 | 111 | 32 | 55 | 175 | 0 | 13 | 239 | 0 | 13 |
| 48 | 92 | 133 | 112 | 30 | 53 | 176 | 0 | 13 | 240 | 0 | 13 |
| 49 | 98 | 133 | 113 | 28 | 51 | 177 | 0 | 13 | 241 | 0 | 13 |
| 50 | 104 | 133 | 114 | 26 | 49 | 178 | 0 | 13 | 242 | 0 | 13 |
| 51 | 109 | 133 | 115 | 24 | 47 | 179 | 0 | 13 | 243 | 0 | 13 |
| 52 | 110 | 133 | 116 | 22 | 45 | 180 | 0 | 13 | 244 | 0 | 13 |
| 53 | 110 | 133 | 117 | 20 | 43 | 181 | 0 | 13 | 245 | 0 | 13 |
| 54 | 110 | 133 | 118 | 18 | 41 | 182 | 0 | 13 | 246 | 0 | 13 |
| 55 | 110 | 133 | 119 | 16 | 39 | 183 | 0 | 13 | 247 | 0 | 13 |
| 56 | 110 | 133 | 120 | 14 | 38 | 184 | 0 | 13 | 248 | 0 | 13 |
| 57 | 110 | 133 | 121 | 12 | 38 | 185 | 0 | 13 | 249 | 0 | 13 |
| 58 | 110 | 133 | 122 | 10 | 37 | 186 | 0 | 13 | 250 | 0 | 13 |

TABLE 5-continued

| Intensity Histogram of Entire Field For Focus + Camera | | | | | | | | | | | |
|---|---|---|---|---|---|---|---|---|---|---|---|
| Bin | Min | Max | Bin | Min | Max | Bin | Min | Max | Bin | Min | Max |
| 59 | 110 | 133 | 123 | 8 | 37 | 187 | 0 | 13 | 251 | 0 | 13 |
| 60 | 110 | 133 | 124 | 6 | 36 | 188 | 0 | 13 | 252 | 0 | 13 |
| 61 | 110 | 133 | 125 | 4 | 36 | 189 | 0 | 13 | 253 | 0 | 13 |
| 62 | 110 | 133 | 126 | 2 | 35 | 190 | 0 | 13 | 254 | 0 | 13 |
| 63 | 110 | 133 | 127 | 0 | 35 | 191 | 0 | 13 | 255 | 0 | 13 |

If the focus filter frequency response test fails, either in pass or stop bands, the failure is logged and system integrity checks are advantageously rerun. Pass bands and stop bands are specific frequencies which depend upon the system being tested. Focus filter response may comprise a non calibratable subsystem and as such may not be adjusted by the system. In one example, a system level integrity test will attempt to measure the systems response a maximum of 5 times. If the filter response does not pass during these attempts the system is halted.

Focus Camera Modulation Transfer Function

Figure 9:
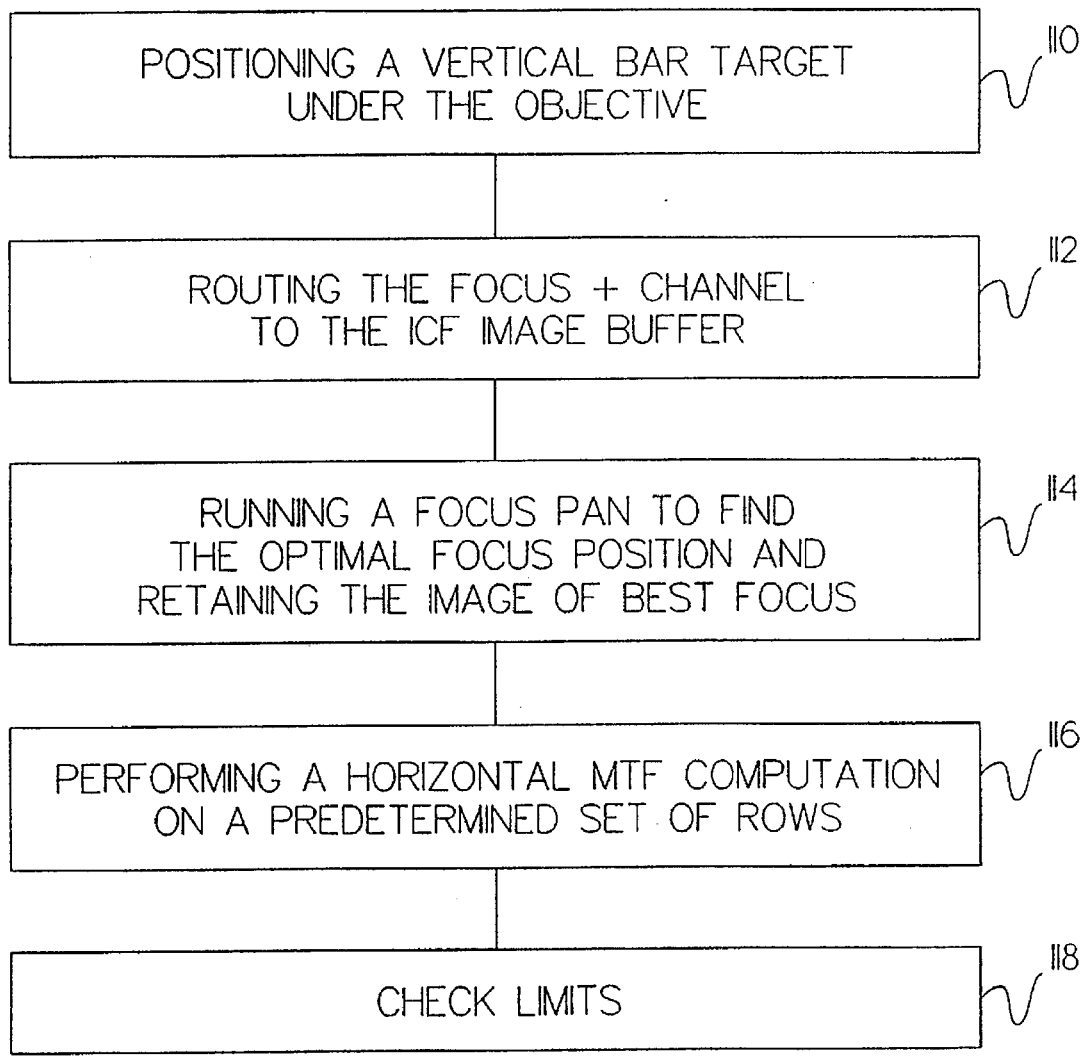
FIG. 9 shows a flow diagram of one method of the invention for checking focus camera MTF.

Now referring to FIG. 9, a flow diagram of one example of the invention for checking focus camera MTF is shown. The focus system relies on several components. In this example, the optics deliver images to the focus cameras at a specified spacing, cameras convert the image into an electronic signal, and the ICF converts the electronic signal into an estimate of the focus of the image projected to the primary camera in the camera head assembly. This test measures a focus camera's ability to represent contrast and fine image detail in its electronic signal.

Modulation transfer function test is substantially similar to the tests measuring MTF disclosed in U.S. Patent Application docket no. 1802 entitled "Cytological System Image Collection Integrity Checking Apparatus", by Ortyn, et al., filed on or before the date of filing this application. The co-pending Ortyn, et al. application is hereby incorporated by reference. One method of performing an MTF test is discussed hereinbelow. The ability of the focus cameras to represent the image accurately with their electronic signal is important to a properly operating focus system and must be checked periodically to insure acceptable operation.

This test may be used to insure operation for a focus camera components in a focus system such as the one described in "Method and Apparatus for Rapid Capture of Focused Microscopic Images", by Jon Hayenga, et. al. discussed further hereinbelow.

Like the primary focus filters, the focus camera modulation transfer function is critical to projecting the focus of best clinical value. An MTF test is conducted for each focus camera to ensure proper operation.

At step 110A the 50 lp/mm vertical bar target is positioned under the objective. In one example, the vertical bar target may be a bar target of 50 lp/mm. At step 112, the focus+ channel is routed to the ICF image buffer. At step 114, an MTF focus pan is performed to find the optimal focus position and the image of best focus is retained. At step 116, a horizontal MTF computation is performed on 32 rows at the center of the image to measure the response of the focus– camera. The same procedure is repeated for the focus– camera.

Given the manufacturer's specification for the camera and the optical transfer function of the preferred embodiment disclosed in "Method for Rapid Capture of Focused Microscopic Images", by Jon Hayenga, et al., Tables 6 and 7 list the focus+ and focus– camera frequency response limits. Measurements that yield lower results than these limits indicate a malfunctioning or substandard camera or optical path.

TABLE 6

| Focus+ Camera MTF | | |
|---|---|---|
| Frequency Limits | | Minimum MTF |
| Minimum | Maximum | Center |
| 0.0 | 0.0 | 0.45 |
| 47.5 | 52.5 | 0.84 |
| 142.5 | 157.5 | 0.73 |
| 237.5 | 262.5 | 0.54 |
| 332.5 | 367.5 | 0.41 |

TABLE 7

| Focus– Camera MTF | | |
|---|---|---|
| Frequency Limits | | Mininum MTF |
| Minimum | Maximum | Center |
| 0.0 | 0.0 | 0.45 |
| 47.5 | 52.5 | 0.84 |
| 142.5 | 157.5 | 0.73 |
| 237.5 | 262.5 | 0.54 |
| 332.5 | 367.5 | 0.41 |

Focus Camera Longitudinal Separation Test

Figure 10:
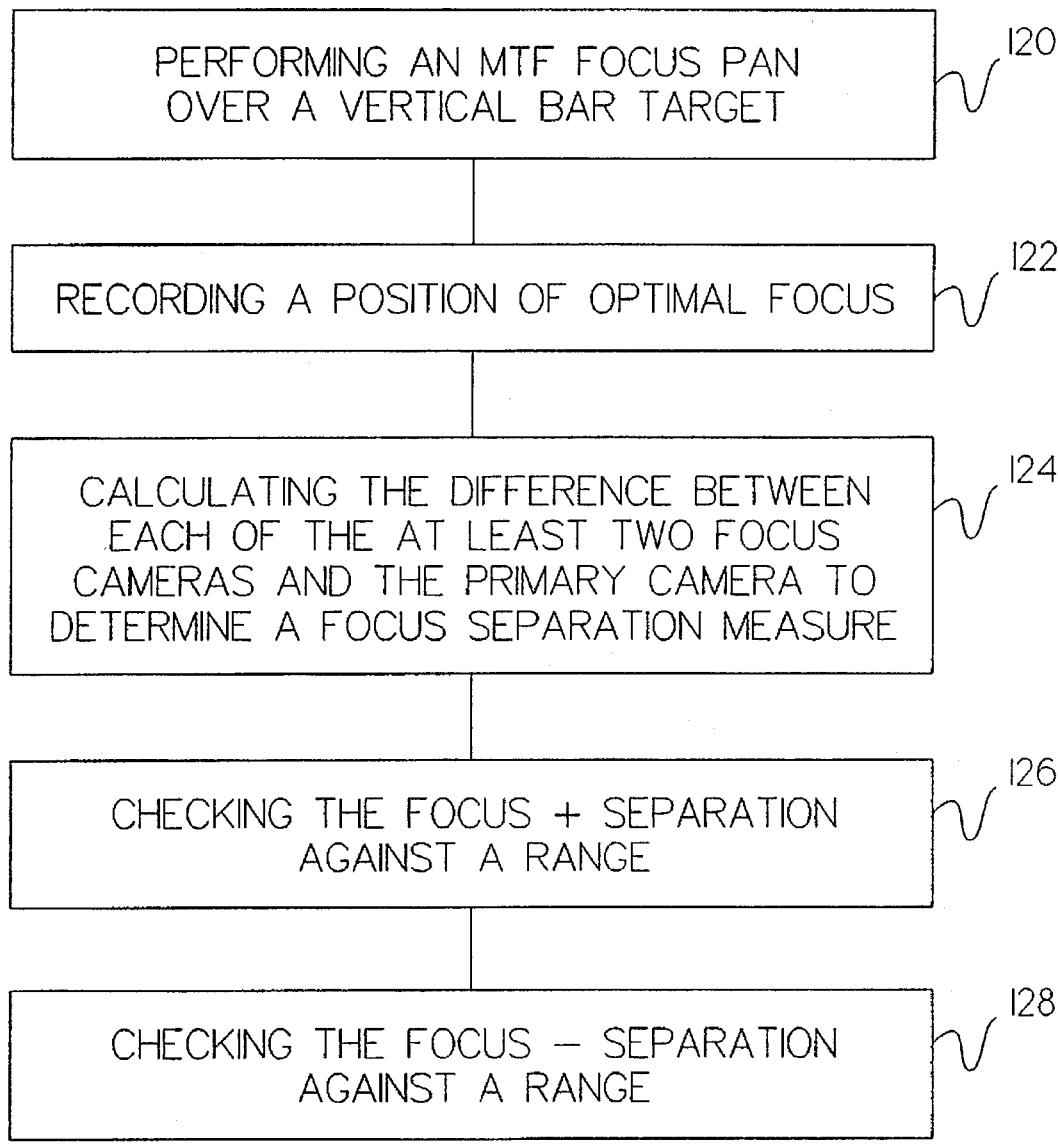
FIG. 10 shows a flow diagram of one example of the method of the invention for performing a focus camera longitudinal separation test.

Referring now to FIG. 10, a flow diagram for one example of a focus camera longitudinal separation test is shown. In a focus system described in Hayenga, et. al., focus cameras are spaced above and below the optimal image plane of the objective. The z-separation between the focus and primary cameras directly affects the focus projection. The z-separation as used refers to the separation of focus positions between the focus camera as along the optical axis. The focus camera longitudinal position test is conducted to ensure that the camera separations are within limits.

At step 120, a z-pan is performed over the 50 lp/mm vertical bar target for the primary camera and each focus camera. The position of optimal focus is recorded at step 122 and the difference between the focus cameras and primary camera is taken to determine the focus separation at step 124. Because of the extremely small dimensions being measured at 20x, for example, the measurement is performed at lower magnification where the effective separation of the focal planes is much larger. This serves two purposes, first the positioning and step size errors at 20x may be a significant percentage of the measurement. Second, the depth of field of the objective at 20x makes any tilt of target a significant contributor to the uncertainty of the estimate of the optimal focus position. Using a lower magnification lens makes both the separation and tilt factors much less significant in the measurement allowing an effective improvement in the separation measurement. The Z-separation at a lower magnification is increased by the ratio of the square of the relative magnifications. At steps 126 and 128 the focus+ separation and focus−separation are checked respectively. One example of tolerance ranges for focus separation is shown below.

Limits

Focus+separation: 3500<x<4500 nm

Focus−separation: −7000<x<−6000 nm

Failing the focus separation test preferably invalidates the results of a previously processed tray of slides.

Focus Camera Lateral Separation Test

Figure 11:
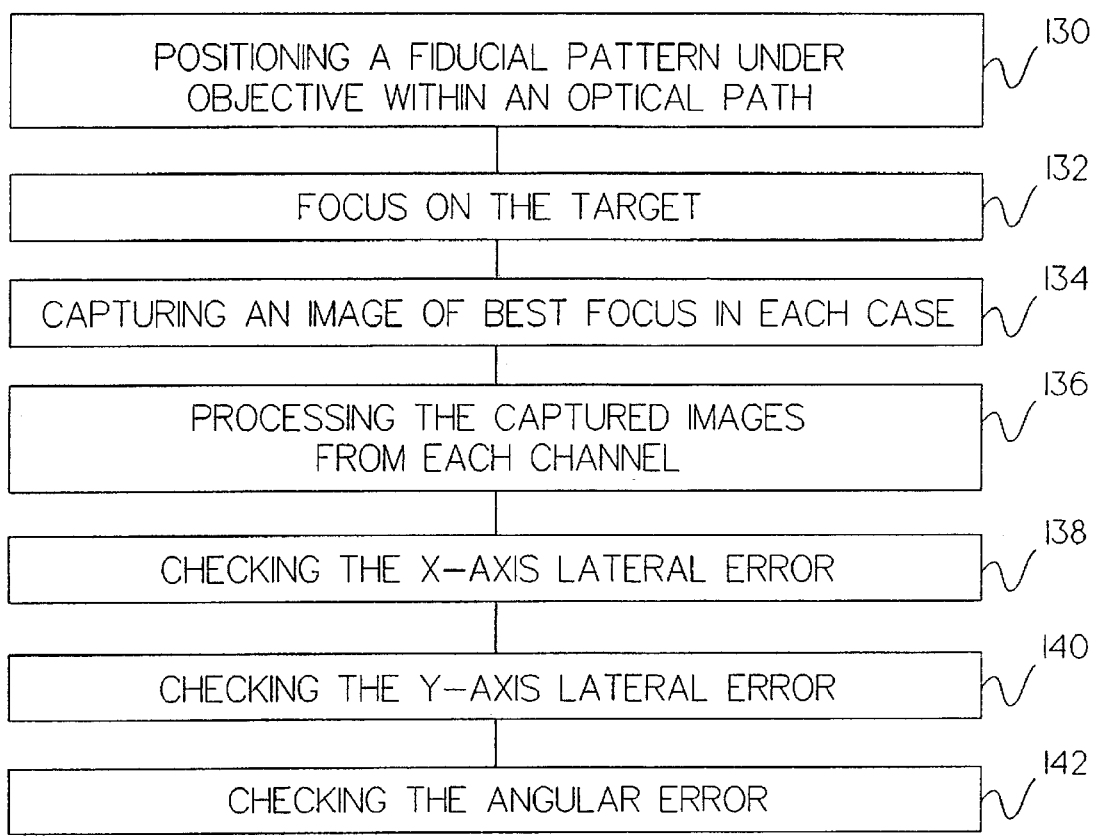
FIG. 11 shows a flow diagram showing one example of the method of the invention for checking focus camera lateral separation.

Now referring to FIG. 11, one example of a focus camera lateral separation test is shown in flow diagram form. A focus projection score, computed as described in further detail below may be derived, in part, by "balancing" the frequency content, of the focus plus and focus minus cameras. It is desirable, therefore, to image the same field position at both focus channels. Lateral misalignment in x or y between channels may result in a different presentation of the field to each camera. Cellular data imaged in one channel may not be imaged at all in the other channel. Mispositioning will potentially cause an imbalance in the overall frequency content of the images presented to each focus camera. A signal imbalance may ultimately skew the focus projection away from optimal focus. In addition, focus line scores, used in determining the focus projection value, are qualified in pairs before they are included into the computation for focus projection. A score from the plus focus camera is combined with a score generated by the corresponding line from the minus focus camera. This qualification technique assumes that the focus line pairs have been exposed to the same region in the image. Severe lateral displacement in y could result in focus score comparisons for different areas of the image. Rotational, or angular misalignment between the focus channels may also result in erroneous focus projection scores for the same reasons mentioned above. It is therefore necessary to adjust and periodically measure these parameters to help ensure proper focus system operation. The focus camera lateral separation test measures these parameters and may advantageously be run prior to processing each tray of slides.

At step 130, a 0,0 fiducial pattern or primitive is positioned under a 20x objective. Alternately, the focus+ and focus−video channels may be routed to the ICF image buffer. A z-pan focus is performed under control of the FOV computers on the target at step 132. A z-pan focus refers to a focusing procedure in which a sample is scanned in the Z axis, that is, along the optical axis, preferably through the focal plane of the optical system. At predetermined increments during the scan, images are acquired by a detector. A plurality of images are processed to determine a feature, or features, related to the focus of each individual image. The feature or combination of features may be, for example,the slope of edge profiles in the image, or, the spatial frequency content of the image, or some other suitable feature. Typically, a plot of the feature or features is generated and an optimal position is determined. The optimal position indicates the best focus position for the image.

For each z-pan, the image of best focus is captured and saved for later analysis at step 134. The images captured from each channel are then processed to determine the extent of any lateral (that is, x and y offsets) or angular offsets between cameras at steps 138, 140 and 142 respectively. The table immediately below shows examples of test limits for the focus camera lateral separation test.

X-axis lateral error: <±67 microns

Y-axis lateral error: <±67 microns

Angular error: <±0.01 radians

Failing the lateral separation test preferably invalidates the results of a previously processed tray of slides.

Closed Loop Accuracy Test

Figure 12:
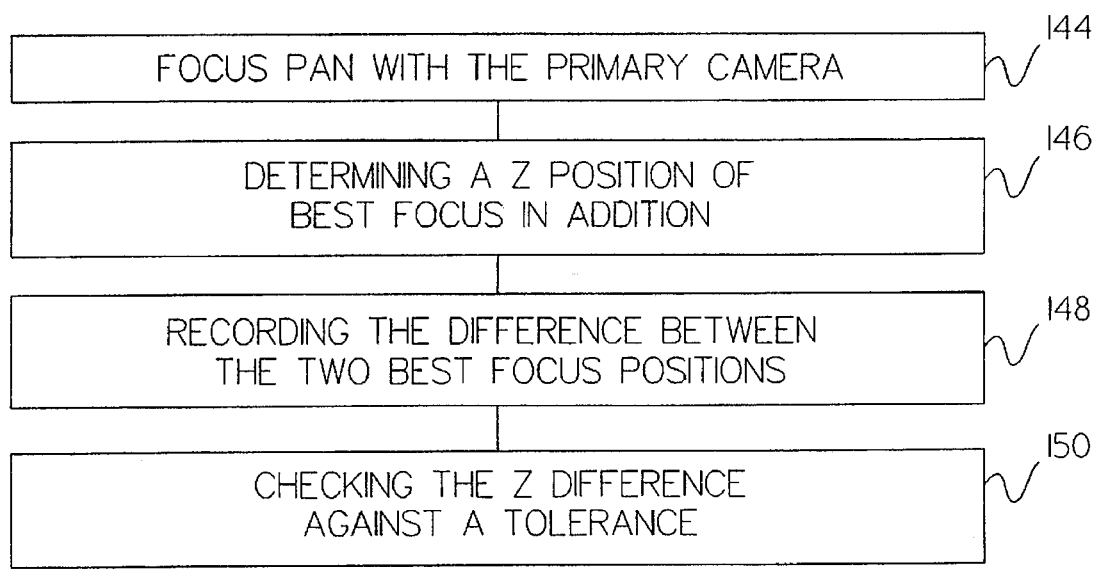
FIG. 12 shows a flow diagram of one example of a closed loop fiducial focus test in accordance with the rest of the invention.

Referring now to FIG. 12, a flow diagram of one example of a closed loop accuracy test is shown. The closed loop accuracy test verifies that the focus achieved by the above and below focus camera method is consistent with the focus achieved using a z-pan focus method. In this case the z-pan is performed using the primary camera in the preferred embodiment of this system. Although all the focus quality tests are important factors in developing an accurate focus projection, an overall closed loop test is required to ensure the system is operating correctly.

At step 144, a z-pan focus is performed on the 0,0 fiducial using the primary camera. Simultaneously, as images are acquired on the primary camera the autofocus system of the instrument is also developing focus projections according to the alternate focussing method taught by Hayenga et al. The best focus for each of the two focusing techniques is determined. The difference in the two best focus positions is recorded at step 148. At step 150 a Z difference is checked against a predetermined tolerance as for example, Z difference: 1000<x<3000 nm.

The purpose of the autofocus system in the preferred embodiment is to provide a real time computation determining the location of best focus. The real time best focus location can be determined with a single flash of the lamp (i.e. real time), as the image of the field of interest is captured by the primary camera and two focus cameras simultaneously. However, the absolute position of best focus must be compared to a standard focus. The z-pan method provides a standard of comparison. Therefore, both methods of focus are compared on a test target. Although the tests outlined previously in this disclosure help to qualify the focus system. This test provides for a final redundant check to ensure the system is operating properly.

Failing may result in invalidating the results of the previously processed tray of slides.

In order to promote further understanding of the invention, on example of a method as taught by Hayenga et al. and employed by the invention for focussing will now be further described. As described above with reference to FIGS. 1A, 1B and FIG. 2, the motion controller 504 includes a stage for receiving the slide 1 and is responsive to a slide scan signal, received from a processor 540, for moving the stage in a slide plane represented by X and Y directions. In the illustrative diagram of FIGS. 1A, 1B and FIG. 2, the X and Y directions are located in the plane that is perpendicular to an optical path intermediate the slide 1 and the condenser 402. The motion controller 504 is further responsive to a slide focus signal for moving the slide 1 in a direction normal to the slide plane, along the optical path 110, for focusing the camera upon the slide 1. The motion controller 504 is constructed to provide a position signal to the processor 540 wherein the position signal is indicative of the X, Y, and Z position of the slide 1. Motion controllers for performing the above-described functions are known in the art and a suitable motion controller may be selected by those skilled in the art.

The camera assembly 512 is constructed to provide an image signal indicative of the optical transmissivity of the specimen on the slide 1. The image signal from the camera assembly 512 is obtained by focusing the camera assembly 512 on a focal point, positioned a first distance along the optical path 110. The camera assembly 512 is further constructed to provide an above focus image signal and a below focus image signal, referred to herein as a focus plus and a focus minus signal, respectively. The focus plus signal is provided by focusing the camera assembly on a focal point positioned a second distance along the optical path 110 wherein the length of the second distance is greater than the length of the first distance. The focus minus signal is provided by focusing the camera assembly on a focal point positioned a third distance along the optical path 110 wherein the length of the third distance is less than the length of the first distance. The image signal, focus plus signal, and focus minus signal are each provided to the processor 540.

The processor 540 uses the focus plus signal and the focus minus signal to determine the positioning of the slide 1 along the optical path 110 necessary for focusing the specimen so that the image signal provided by the camera 512 will be in focus. More particularly, the processor 540 determines whether the received signal is of a magnitude large enough to focus, whether the image plane lies within the correctable region, and which direction to move the slide 1 to focus the image.

Figure 13:
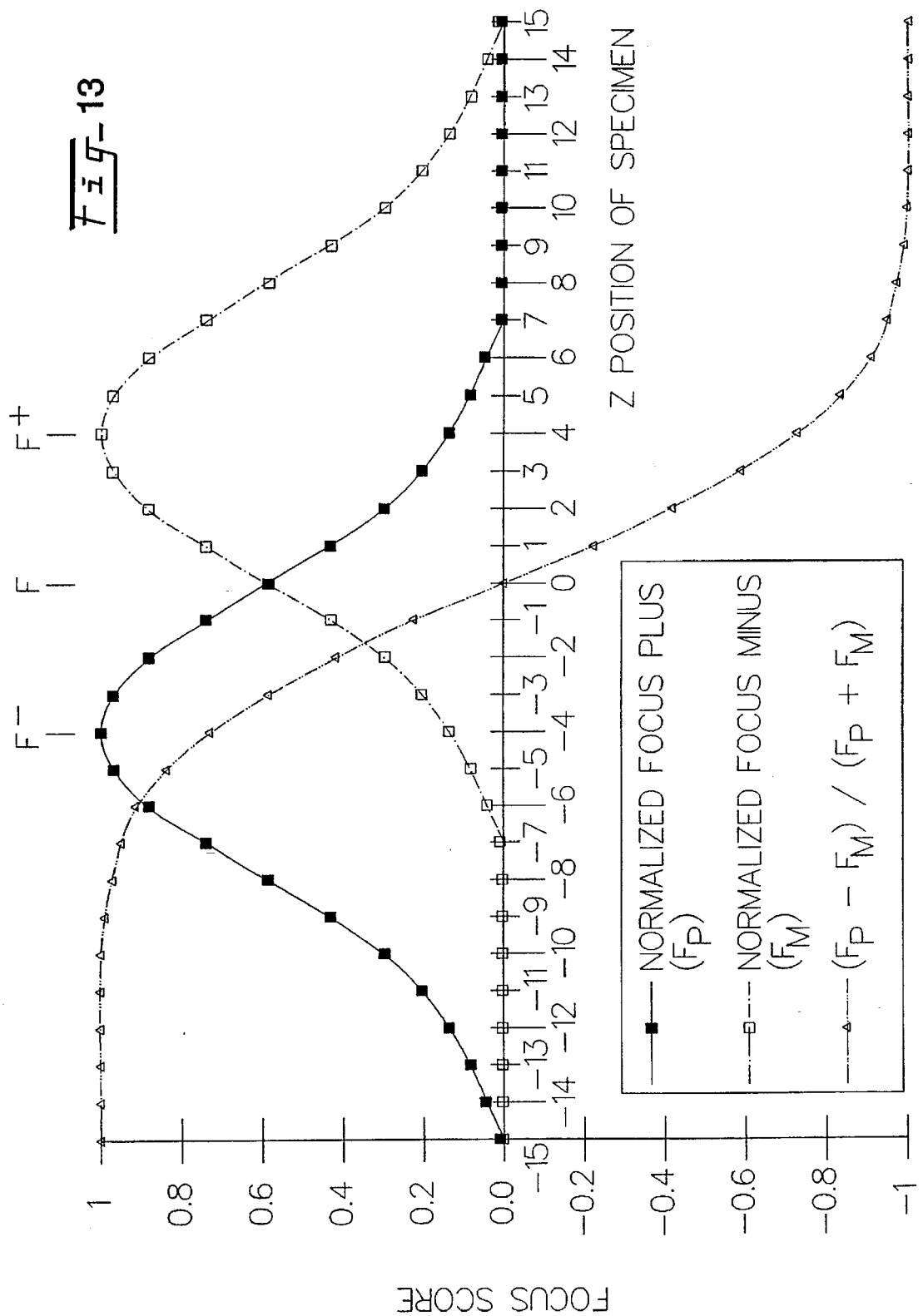
FIG. 13 is a graph illustrating the relationship between the passband frequency component of the signal provided by the camera assembly of FIG. 1A and the focus of the camera assembly.

Generally, the processor 540 determines the magnitude of the band-pass frequency energy in the focus plus and focus minus signals. As illustrated in FIG. 13, the image signal will be in focus when the band-pass frequency energy of the focus plus and focus minus signals are substantially equal. Accordingly, to determine the proper positioning of the slide 1 along the optical path, the processor 540 need only determine how far the slide must be displaced for the energy provided by the focus plus and focus minus signals to be substantially equal. It will be apparent to those skilled in the art that the relative positioning of the focal point of the camera assembly when providing the focus plus signal and focus minus signal is determinative of the relationship between their band-pass frequency energy components and the positioning of the camera assembly for providing a focused image signal.

So that the image signals may be obtained more rapidly, the processor 540 is constructed to provide the scan signal to position the motion controller 504 in a plurality of X-Y positions to obtain a plurality of image signals indicative of a respective plurality of images of a portion of the specimen on the slide 1. The processor 540 may be further constructed to determine the proper positioning of the slide 1 along the optical path for each of the plurality of image signals obtained. After each of the plurality of image signals has been obtained, the processor 540 can determine whether the slide is focused by examining the band-pass frequency component of the focus plus signal and the focus minus signal, as discussed above. If the image signals were not focused, the processor 540 will determine the proper positioning of the slide for focus and will provide the scan signal to the motion controller 50 to re-position the slide 1 in the X-Y positions of the portions not focused and, simultaneously, provide the slide focus signal to the motion controller 504 to obtain the proper positioning of the slide 1 along the optical path so that focused image signals are obtained.

Figure 14:
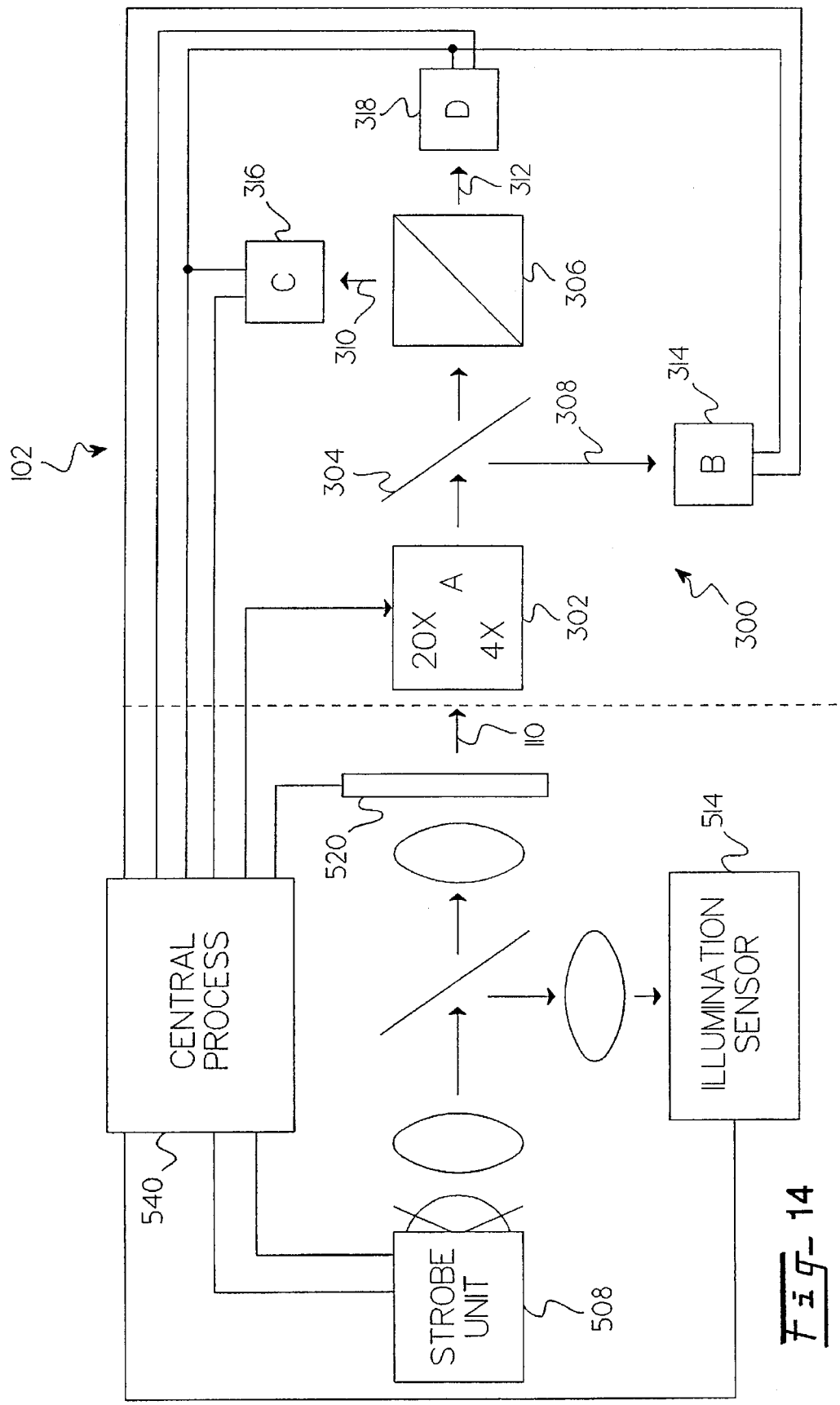
FIG. 14 is a more detailed illustrative diagram of the camera assembly that comprises the subject invention.

A more detailed diagram of the camera assembly 512 is provided in the illustrative diagram of FIG. 14. Therein, an optical transmission assembly 300 includes an objective lens assembly 302, a first beam splitter 304 and a second beam splitter 306. The first and second beam splitters 304 and 306 provide first, second, and third optical paths 308, 310, and 312, respectively. The objective lens assembly 302 is constructed to vary the magnification provided to the specimen on the slide 1. In a presently preferred embodiment of the invention, the objective lens assembly 302 is responsive to a magnification signal received from the processor 540 to select various lenses to vary the magnification. Suitable assemblies for responding to an electric signal to move two or more lenses into and out of position for varying the magnification provided to the specimen may readily be provided by those skilled in the art.

A primary camera 314 is positioned to receive a first image of the specimen on the slide 1 via the first optical path 308. The first optical path 308 is the path from point A on the objective 302 to point B at the CCD of the primary camera 314. The primary camera 314 is responsive to an activation signal for providing an image signal representing the first image. A focus plus camera 316 is positioned to receive a second image of the specimen on the slide 1 along a second optical path 310. The second optical path 310 is the path from point A on the objective 302 to point C on the CCD of the focus plus camera 316. The length of the second optical path 310 is less than the length of the first optical path 110 by a predetermined length. The focus plus camera 316 is also responsive to the activation signal for providing a focus plus signal, wherein the focus plus signal is indicative of the focus of the image signal. A focus minus camera 318 is positioned to receive a third image of the object on the slide 1 via a third optical path 312. The third optical path is the path from point A on the objective 302 to a point D on the CCD of the focus minus camera 318. The length of the third optical path 312 is greater than the length of the first optical path 308 by the predetermined length. The focus minus camera 318 is responsive to the activation signal for providing a focus minus signal that is also indicative of the focus of the image signal.

As discussed above, the processor 540 determines the band-pass energy of the focus plus signal and the focus minus signal to determine the proper positioning of the slide 1 so that the image signals will be representative of a focused image of the specimen on the slide. Accordingly, the processor 540 includes first and second identical focus processor circuits 400 and 403, as illustrated in FIG. 12. The focus processor circuits 400 and 403 each include a band pass filter 404 and 406, respectively, for receiving the focus plus and focus minus signals. The band pass filters 404 and 406 are constructed to pass a band-pass energy component of the focus plus and focus minus signals. Each filtered signal is multiplied by itself in respective multiplier circuits 408 and 410 so that the resulting signal is always proportional to the magnitude of the energy. This energy level signal is then integrated for each line of active video provided in respective integrators 412 and 414 to provide signals indicative of the total energy provided in the band-pass. The output from integrators 412 and 414 is sampled by respective sample and hold circuits 416 and 418 before being digitized by an analog-to-digital convertor 420. The processor 540 uses the signals from the analog-to-digital convertor 420 to determine the proper positioning of the slide 1 so that the image signals provided by the primary camera 314 will be representative of a focused image.

In operation, the processor 540 receives an array of focus plus scores FP(0), FP(1), . . . FP(255), and array of focus minus scores FM(0), FM(1), . . . FM(225), each including 256 elements, one for each line of a particular field of the camera 512. The focus plus and focus minus arrays provide video signals to the focus processor which are used to calculate the focus score. Only the first field of the interlaced video image is used to calculate the focus score so that the acceptability of the image may be determined while the second field is still being received from the camera. In this manner, the focus score is available before the entire image is received. Each line of the image is processed through bandpass filters and the energy is integrated and measured by the analog-to-digital converters.

Figure 16:
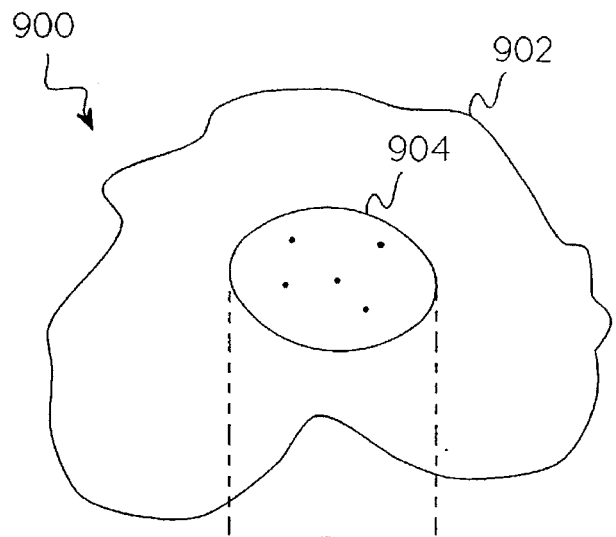
FIG. 16 shows a schematic view of a typical cell.

In order to further understand the filter selection process of the invention, refer to FIG. 16 where a schematic view of a typical cell is shown. A cell 900 comprises cell cytoplasm 902 and a cell nucleus 904. Typical cell nuclear sizes for pap smears range in area from about 40 micrometers squared to 220 micrometers squared. Typical nuclear diameters range from about 4 micrometers to 10 micrometers. In one example embodiment of the invention where the magnification of interest is 20x, pixel size is 0.55 micrometers per pixel.

Figure 17:
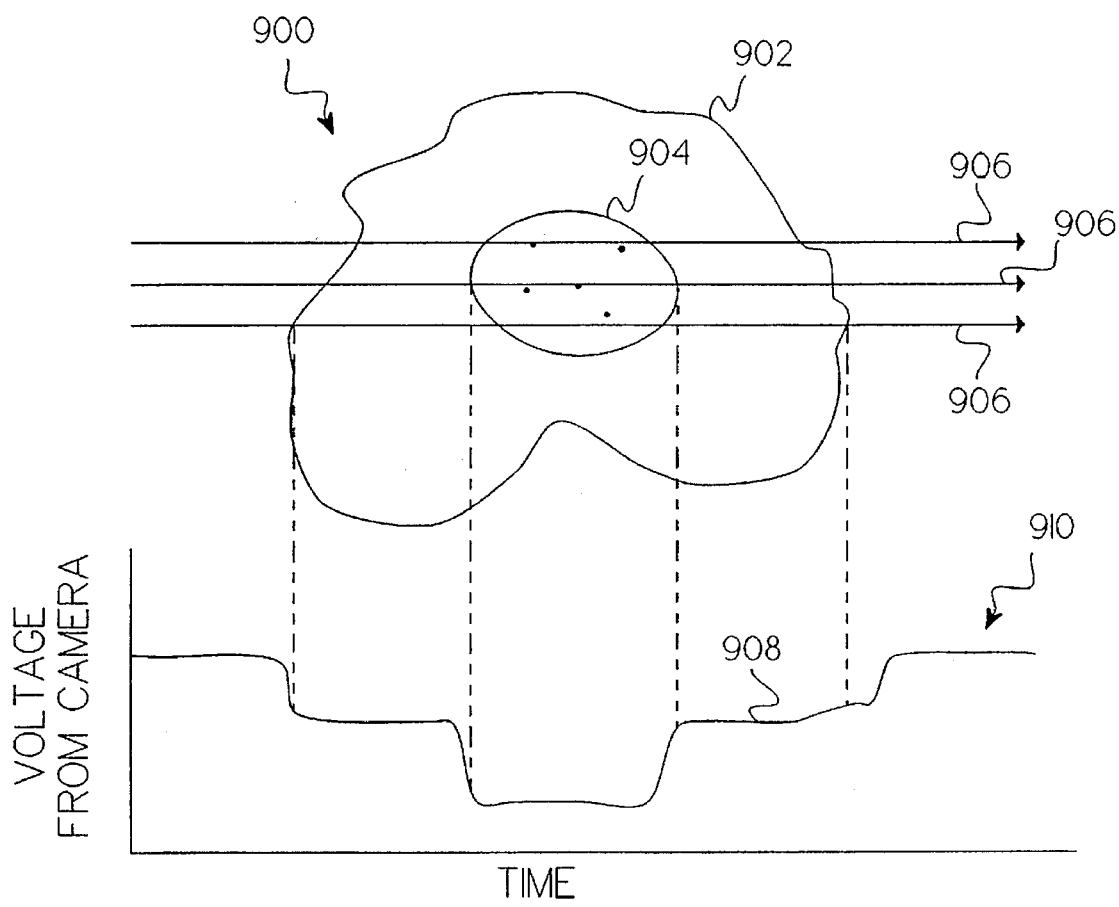
FIG. 17 shows a process for converting physical cell size into electrical band width.

Now referring to FIG. 17, a process for converting physical cell size into electrical band width is schematically illustrated. The conversion from physical size into electrical band width may be accomplished by using the known pixel clock rate from the camera. In this example, the pixel clock rate is $14.1875 \times 10^6$ pixels per second. From the pixel clock rate, the physical size of a cell nucleus may be translated into a time varying voltage when the camera images the cell nucleus. This technique is well known in the art. The pixel time in one example of the invention is about $70.5 \times 10^{-9}$ seconds. The target for the focus system is between 7 and 19 pixels in size. Because some spreading of the object size occurs due to defocused images being used as the stimulus to the cameras for measuring focus, the size range is increased slightly. The focus system may advantageously be made sensitive to objects having a size of from 7 to 22 pixels. A nucleus sectioned by a video camera scan line 906 has a time varying modulation 908 in the electrical domain, which correlates to its size in the spatial domain. The relationship between the spatial domain and electrical domain is illustrated in FIG. 17 which shows the cell 900 having its nucleus 904 scanned by video lines 906. The scanned cell is then translated into electrical voltages as indicated by plot 910 which plots a modulated voltage signal 908 against time.

Figure 18:
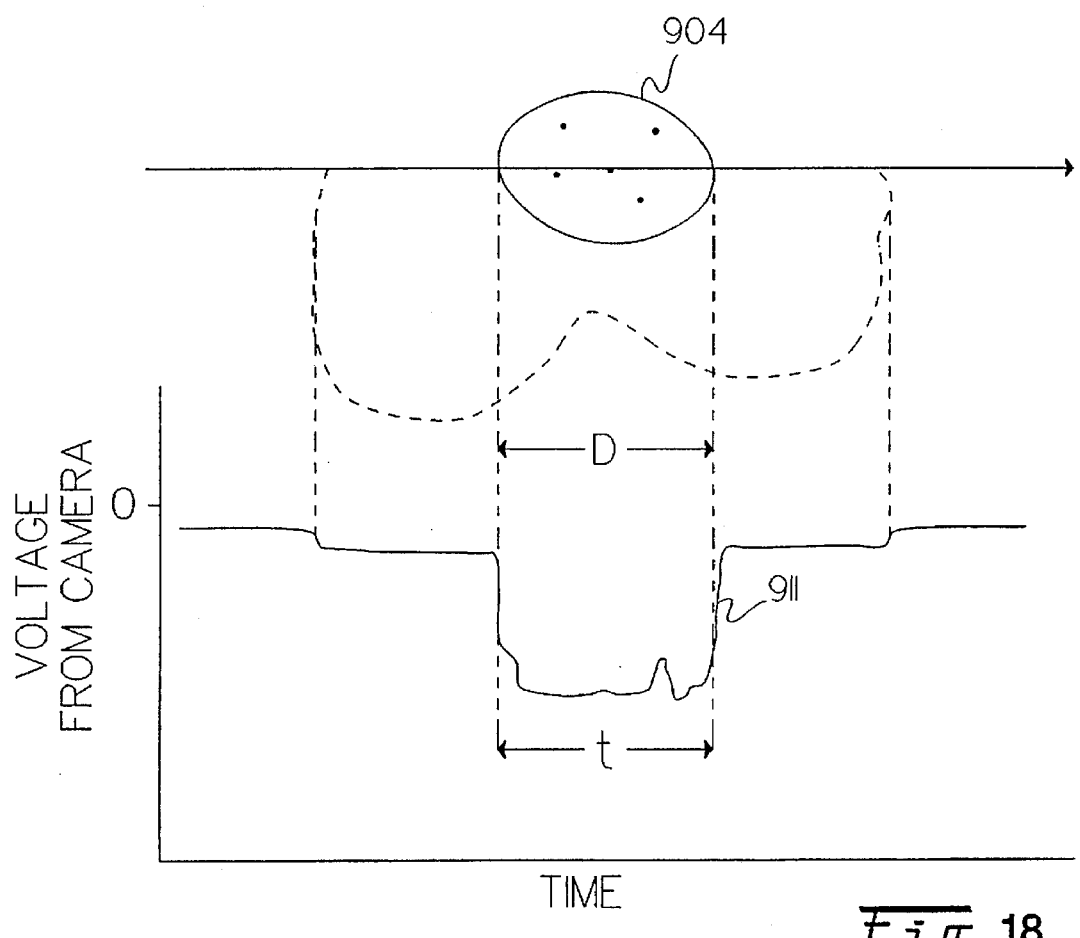
FIG. 18 graphically illustrates a time vary voltage of a dark nucleus.
Figure 19:
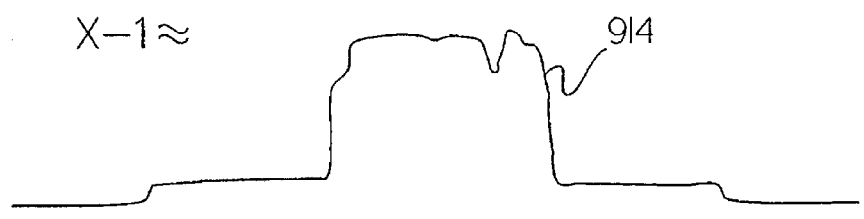
FIG. 19 shows an inverted pulse representing a square function.

Referring now to FIG. 18, a time vary voltage of a dark nucleus is graphically illustrated. The nucleus 904 is analogous to a pulse or square function 912 having an interval,t. In this example, shown for illustrative purposes and not by way of limitation of the invention, the interval t may range from about $493 \times 10^{-9}$ to $1550 \times 10^{-9}$ seconds. FIG. 19 shows an inverted pulse 914 which is inversely related to pulse 911. Fourier transformations for such square functions are well known.

Figure 20:
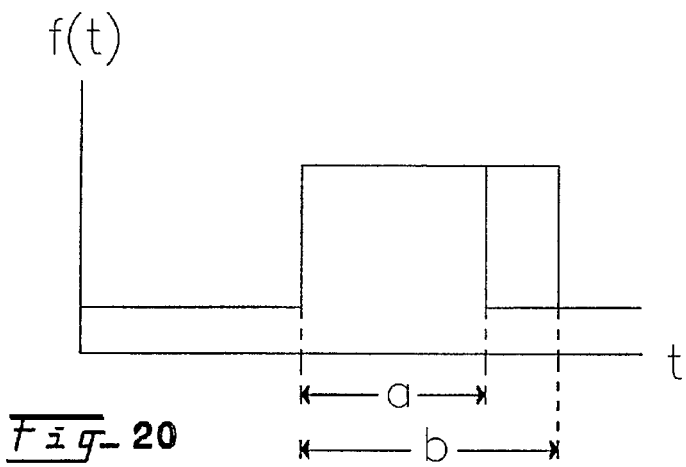
FIGS. 20 and 21 show a Fourier transformation for a square function as employed in one aspect of the invention.
Figure 21:
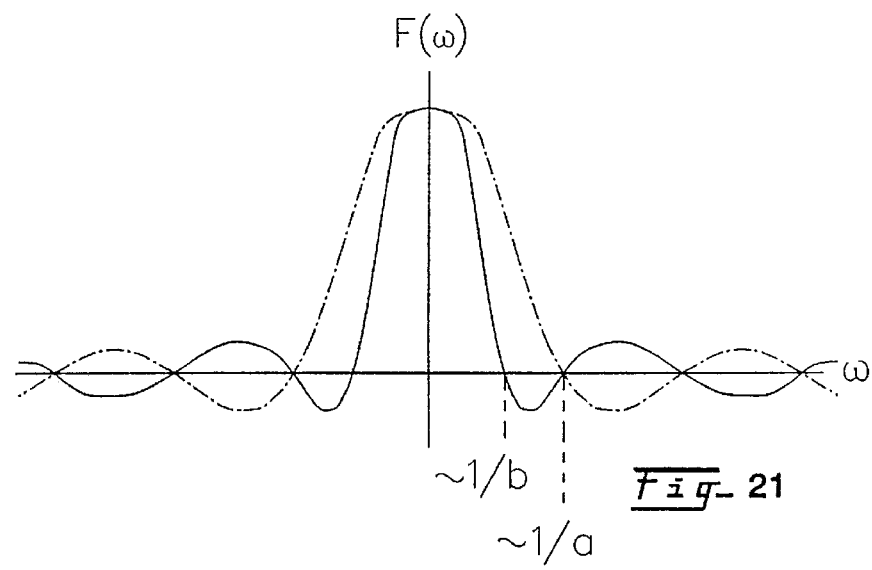

Referring now jointly to FIGS. 20 and 21, a Fourier transformation for a square function is illustrated as employed in one aspect of the invention. Where a is the smallest nucleus and b is the biggest nucleus, the focus transformation of such pulses then represent spectral energy of objects of the particular size of interest. Using the Fourier representation of these objects, a spectral filter may be chosen which is sensitive to objects in this size range.

Figure 22:
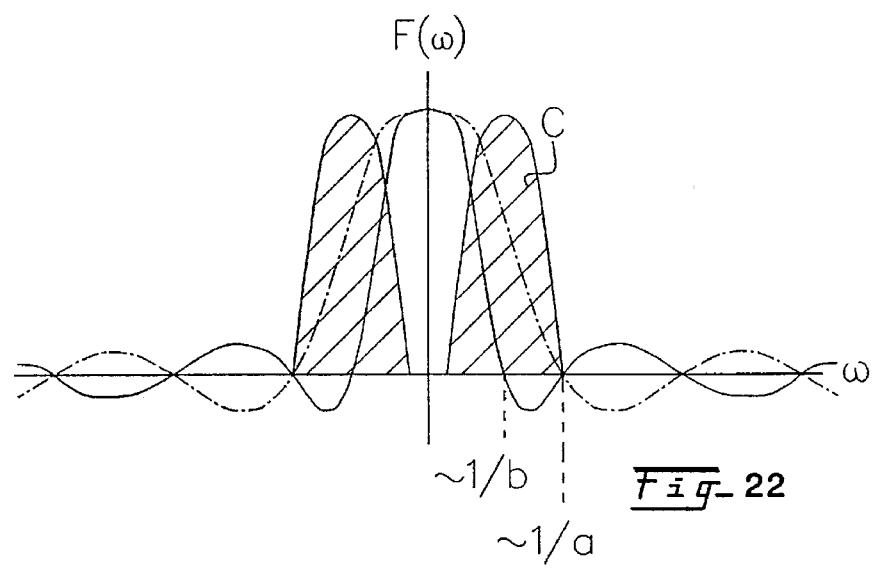
FIG. 22 illustrates a filter response sensitive to objects of interest, such as cell nuclei as employed in one embodiment of the invention.

Referring now to FIG. 22, filter response sensitive to objects of interest, such as cell nuclei, is schematically illustrated. Filter response C may be selected so that the focus system is sensitive to cell nuclei in the size range of interest. Once having the benefit of knowing the filter response desired for objects in the range of interest as taught by the present invention, a band pass filter may then be designed using conventional techniques.

Next, a filter operation is performed on each of the four arrays FP, FM, FPnoise, and FMnoise in order to reduce sensitivity to objects that are smaller than the desired cells that are to be focused on. The filter operation is sensitive to the vertical size of objects, whereas the band pass filter on the video lines are sensitive to the horizontal size of objects. Accordingly, the system is sensitive to the two dimensional size of objects in the focus system. This provides an improved focus and improves signal-to-noise ratio.

The filter operation can be expressed as follows:

[FP(0) ... FP(255)]*[Ffk(0) ... Ffk(4)] →[XFPS(2) ... XFPS(253)]

[FM(0) ... FM(255)]*[Ffk(0) ... Ffk(4)] →[XFMS(2) ... XFMS(253)]

The focus plus and focus minus array are each convolved with a filter array Ffk to correlate the energies of adjacent lines. The filter array Ffk is selected to provide a low pass filter that looks for objects at least five lines in size. The filter array Ffk is selected to provide a finite impulse response, low pass filtering of the focus plus and focus minus arrays. The filter kernel is designed to be sensitive to the size and type of object that the processor 540 is attempting to detect. Further, the finite impulse response filtering is performed in a manner so that the resulting filter array eliminates the first and last few elements of the respective focus plus and focus minus array to eliminate edge effects from the filter.

After filtering the focus plus and focus minus arrays, filtered focus plus and focus minus arrays, XFPS and XFMS, respectively, are created with each array including 252 elements. The filtered focus scores are further combined with a noise array to eliminate noise that may be provided by the camera system 512. More particularly, the camera system 512 may include noise that results from camera noise, integrator leakage, dust o streaks on the focus camera, or in one of the optical image planes. To eliminate this noise, a noise array is generated and combined with the filtered focus scores. The noise array is generated by focusing the camera 512 upon a white field, i.e., one with no slide 1 so that the focus plus and focus minus camera can measure the fixed noise floor energy within the focus filter band pass. The blank image is viewed in order to obtain a measure of the fixed noise patterns that will stimulate the focus processor. The noise arrays of raw focus scores obtained from viewing the blank image are represented as: [FPnoise(0) ... FPnoise (255)] for the focus plus array; and, [FMnoise(0) ... FMnoise(255)] for the focus minus array. The noise floor integration is relatively consistent and can be measured and subtracted from the energy measurements made for the individual line scores. This significantly improves the signal to noise ratio for each line.

In this regard, a noise plus and noise minus array is measured for the focus plus and focus minus cameras 316, 318 in the same manner as the focus plus and focus minus signals, discussed above. The noise plus and noise minus arrays include an element for each line of the focus plus and focus minus arrays, respectively. The noise plus and noise minus arrays are convolved with the filter array Ffk, as discussed above with the focus plus and focus minus arrays, to provide filtered noise plus and filtered noise minus arrays, FPNX and FMNX, respectively. The resulting arrays are filtered noise plus and filtered noise minus arrays, having a one-to-one correspondence with the focus plus and focus minus arrays, respectively. The filter operation on the noise arrays are expressed as follows:

[FPnoise(0) ... FPnoise(255)]*
  [Ffk(0) ... Ffk(4)] →[FPNX(2) ... FPNX(253)]
[FMnoise(0) ... FMnoise(255)]*
  [Ffk(0) ... Ffk(4)] →[FMNX(2) ... FMNX(253)]

The filter operations are a convolution, shown in the above equations by the asterisk symbol. The 2 elements on each end of the filtered arrays are excluded since the convolution operation is not defined for the elements on each end of the array. The filtered noise plus and noise minus arrays, FPNX and FMNX are correspondingly subtracted from the filtered focus plus and focus minus arrays, XFPS and XFMS, to provide respective focus plus and focus minus signal arrays, FPS and FMS. This improves the S/N ratio. The noise value can be as much as 10%–50% of the total signal. Since the noise is static and repeatable, it can be removed with this method. The noise reduced arrays are as follows:

[XFPS(2) ... XFPS(253)]–[FPNX(2) ... FPNX(253)]= FPS[(2) ... (253)]
[XFMS(2) ... XFMS(253)]–[FMNX(2) ... FMNX(253)]=FMS[(2) ... (253)]

The individual elements of the focus plus signal and the focus minus signal arrays are now combined to provide an array of focus scores FS. Now, lines 2 through 253 have scores which are noise reduced and related to the two dimensional characteristics of above and below focus images. Each line from the above and below cameras represents a measure (in 2D) of the image frequency content. An array of focus scores can now be calculated as follows:

$$FS[(2)\ldots(253)] = \frac{FPS[(\,)\ldots(\,)] - FPM[(\,)\ldots(\,)]}{FPS[(\,)\ldots(\,)] + FPM[(\,)\ldots(\,)]}$$

This step produces a normalized focus score for each line of the camera 512, except the first and last few lines that were excluded because of edge filter effects, as discussed above. Normalization of the focus scores helps to make the data independent, i.e., tends to make each score comparable to one another regardless of the amount of data used to produce the score. This operation normalizes the focus scores to values somewhere between −1 and +1, to create a spatially distributed set of focus scores.

After the focus plus signal array and focus minus signal array have been combined as discussed above to produce an array of focus scores, the array of focus scores is screened to eliminate those scores for which insufficient data existed to achieve a meaningful score. This is done by eliminating each score FS(x) for which FPS(x) plus FMS(x) is outside the range of a predetermined threshold. The threshold range is selected empirically by the lowest signal content image of interest. In a preferred embodiment of the invention, the range is selected to be between 3 and 240. Those skilled in the art will appreciate, however, that this range is only illustrative and that any range, including the full range, may be selected. In one embodiment, favorable results may be obtained using between 1% and 95% of the range. The FS values that qualify are then averaged to yield a single focus score evaluation for the image. This single focus score is a number between −1 and +1 which has a one-to-one correspondence with the distance necessary to move to put the image into best average focus.

In one aspect of the invention, a focus quality score, FQS(x), may be provided. The focus quality score comprises the average of FPS(x) plus FMS(x). The focus quality score indicates the signal level of the image and thereby provides a confidence level for the focus score. If the focus quality score is below a predetermined level, the focus score is not accepted as a reliable focus indicator.

After the focus score has been obtained a look up table is consulted for determining the distance and direction of movement along the optical path necessary to bring the object into focus. As noted above, a particularly novel aspect of the subject invention is the ability of the processor 540 to not only determine whether an image is in focus or out of focus, and not only determine the direction necessary to move the specimen to bring the image into focus, but to also determine the distance of motion necessary to bring the specimen into focus. By determining the exact displacement, and direction of displacement, necessary to bring the specimen into focus, the processor 540 may control the motion controller 504 to rapidly return to the position of any out of focus specimen and may provide the appropriate scan signal so that the motion controller will position the specimen to be in focus.

To determine the amount of displacement, a look up table comprising predetermined correction factors for a given set of optics is employed prior to obtaining any image signals. The correction factors may be derived empirically, for a each set of optics, using known methods. The correction factors in the look up table represent the distance necessary to move an object into focus. Since the focus scores relate to distance, the correction factors may be related to focus scores. When deriving the correction factors, a test image is employed and placed on the motion controller. In a presently preferred embodiment of the invention, a calibration to determine the displacement and direction correlation to focus scores is performed only once when the system is designed and remains the same so long as the component parts of the system are not disturbed. However, those skilled in the art will appreciate that the calibration to obtain data correlating the focus scores to the amount and direction of displacement may be performed at any time prior to obtaining image signals.

Using the above-described apparatus, focused image signals may be obtained in a very rapid manner. In a presently preferred embodiment of the invention, the motion controller 504 positions the slide 1 at a plurality of predetermined positions for obtaining image signals. After each image signal is obtained, the motion controller 504 immediately moves to obtain the next image signal. While the motion controller 504 is positioning the slide 1 to obtain the next image signal, the processor 540 determines whether the last obtained image signal was in focus. Accordingly, there is a 60 millisecond delay between the time that the image is taken and the time the image it is read out of the processor 540. If the last obtained image was in focus, processor 540 identifies the image signal as a focused image signal for use by the remainder of the system. However, if the image signal was not in focus, the processor 540 determines the displacement and direction necessary for focus of the specimen. Thereafter, the processor 540 instructs the motion controller 504 to return to the out of focus image and provides the necessary displacement information so that, when next obtained, the image will be in focus.

Modulation Transfer Function

Modulation transfer functions are well known and typically comprise a curve of contrast in the image plane versus spatial line frequency of a sinusoidal input in the object plane. See, for example, Smith, *Modern Optical Engineering*, pp. 308–323, McGraw-Hill Book Company, 1966. A novel modulation transfer function test is explained in detail in co-pending U.S. Patent Application attorney docket no. 11c/1802 entitled "Cytological System Image Collection Integrity Checking Apparatus," by Ortyn, et. al, filed on or before the date of filing of this application, assigned to the same assignee as this application. The co-pending Ortyn et al. application is hereby incorporated by reference.

Figure 23:
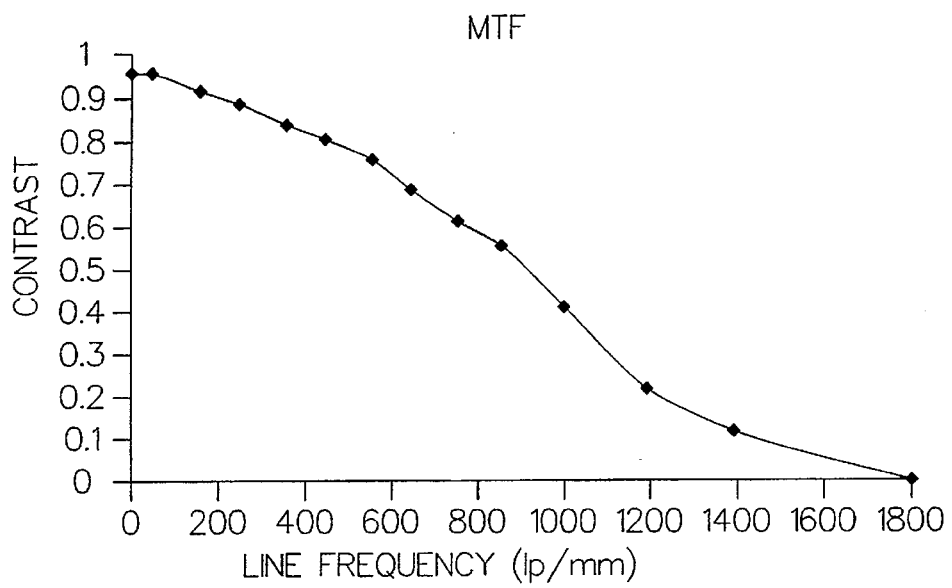
FIG. 23 shows an example of a modulation transfer function as employed in one embodiment of the invention.
Figure 24A:
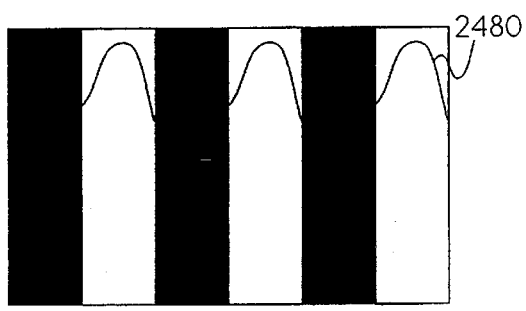
FIGS. 24A, 24B, 24C and 24D show bar patterns of progressively increasing spatial frequency and an intensity profile of those bar patterns in an image plane.
Figure 24B:
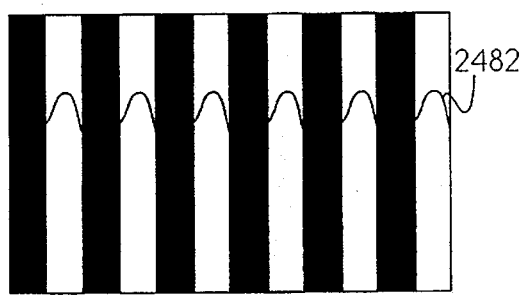
Figure 24C:
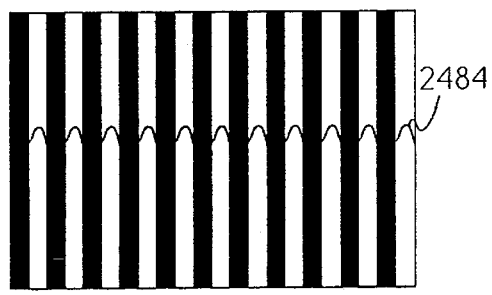
Figure 24D:
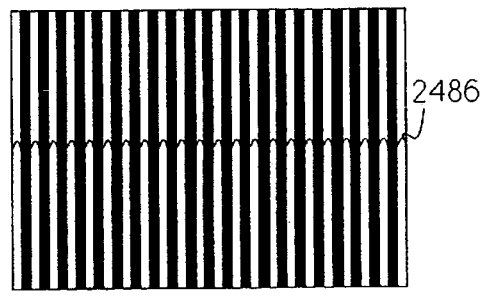

FIG. 23 shows an example of an MTF. As the line frequency of the object increases, that is, as objects get smaller and closer together, the ability of an automated system to provide contrast in the image decreases. FIGS. 24A, 24B, 24C and 24D show bar patterns of progressively increasing spatial frequency. Also shown are intensity profiles 2480, 2482, 2484 and 2486 of those bar patterns in the image plane. As line frequency increases the, contrast in the image plane decreases. Beyond a predetermined cutoff frequency, the contrast is zero (i.e. there is no modulation in the image). Modulation is defined as follows:

Modulation=(max−min)/(max+min)

where:

max and min are the maximum and minimum intensity values in the image plane.

There are typically two methods for generating an MTF plot. The first method involves conducting a series of contrast measurements over a set of discrete bar patterns. The contrast is measured at each bar pattern and a pseudo MTF curve is gradually generated. The first method does not actually generate an MTF curve because a true MTF test has a sinusoidal input. Sinusoidal targets are very difficult to generate and usually cannot be generated at very low frequencies. Therefore, a bar pattern, which generates a square wave, is usually used. Although this is not true MTF, it is common practice. Another problem with the first method is that bar patterns are difficult to generate at very high frequencies such as those above 250 lp/mm (i.e., 2 micron line widths). The problem is that many optical systems have a cutoff frequency around 2000 lp/mm. Therefore, this method can only test the pseudo square wave MTF in the lower part of the MTF curve.

Another method used to test MTF employs imaging a very small slit or small point of light in the object plane. If the slit or point is small relative to the optical resolution of the system, the resulting distribution of light in the image plane is referred to as the line or point spread function respectively. The convolution of the point or line spread function for a given optical system with a sinusoidal object as an input function yields the image, incorporating the contrast and phase shift, of that object for the system under test. Therefore, an MTF plot can be constructed by determining the line spread function in the manner stated and convolving it with a series of input sinusoids of varying frequency to determine the MTF function for a system. This method is often employed in MTF test systems for single lenses of low numeric aperture. In order for this approach to yield accurate results, two conditions must be met. First, the test sample, eg. slit or point, must be small relative to the optical resolution of the system. Second, the magnification coupled with the pixel (or sample) size of the system must result in an accurate quantification of the point spread function. These two constraints are often difficult to meet. The following example demonstrates this fact. Consider a 20X optical system with a numeric aperture of 0.75 and a detector pixel size of 10 microns. In the example the diffraction limited optical resolution in the object plane is 0.4 microns (as determined by the formula below). In accordance, the entire Airy Disk (TM) diameter is only 0.8 microns. δ radius=0.61λ/NA where: λ is 0.500 microns Likewise the pixel size in the object plane is [pixel size/magnification] or 10 microns/20=0.5 microns pixels. This case illustrates both problems with this method. First, it is difficult to manufacture a slit with a sub micron width. Second, the pixel size of 0.5 microns is inadequate to sample a line or point spread function with an Airy Disk (TM) diameter of 0.8 microns. As a result, there are not enough samples to reconstruct the function.

Both of the methods discussed so far are inadequate to characterize the MTF many optical systems. The method disclosed herein alleviates these shortcomings.

One method which may be employed by the invention uses a single low frequency bar pattern to determine an actual MTF in a given axis. The frequency is low and the pattern is a square wave. Therefore, the target is easy to manufacture. The method of the invention also allows the MTF to be determined to the cutoff frequency of the optical system and is relatively independent of the pixel size of the detector.

Figure 25A:
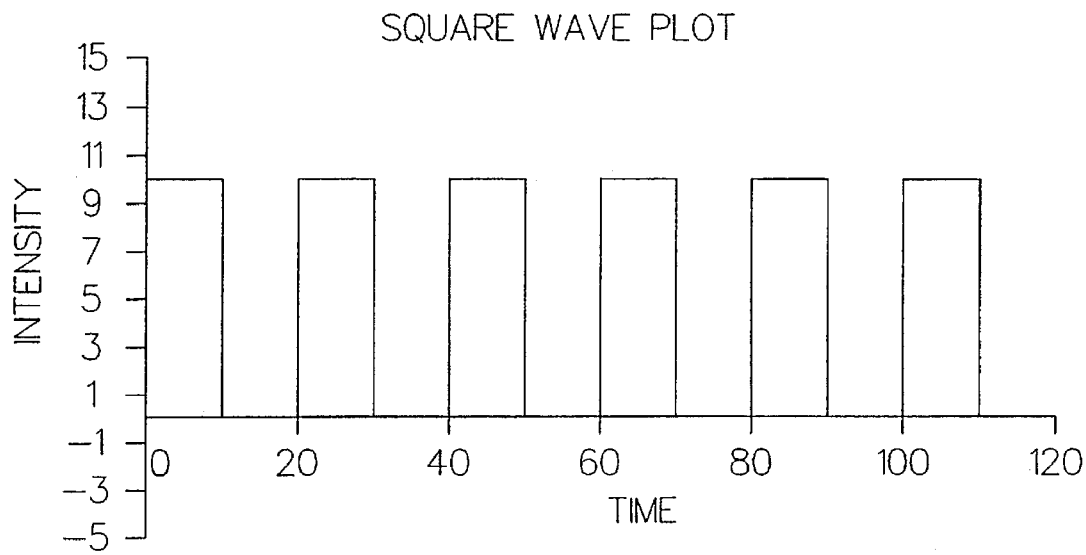
FIG. 25A shows a square wave plot for a theoretically perfect square wave.
Figure 25B:
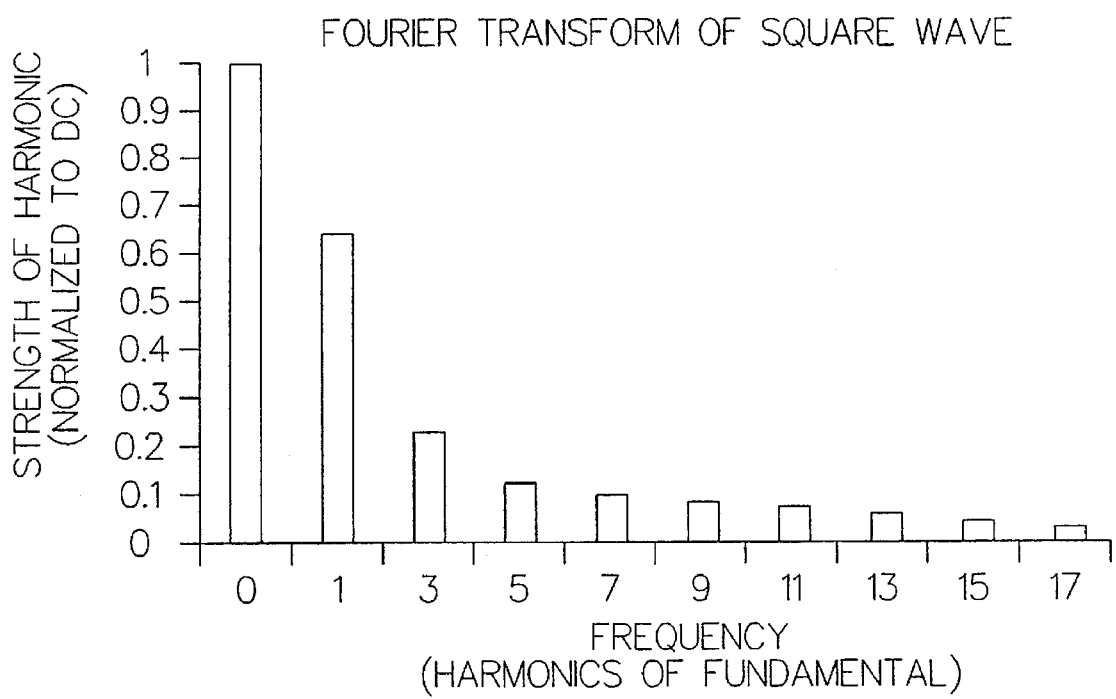
FIG. 25B shows the Fourier transform of a perfect square wave.

Fourier theory states that a periodic function of x with a spatial period of λ, can be synthesized by a summation of harmonic functions whose wavelengths are integral submultiples of λ (that is λ, λ/2, λ/3 . . . ). This theory may be utilized judiciously in the case of MTF determination for an optical system. In this case, a square wave or bar target may be employed if one realizes that a square wave is a summation of sinusoids whose wavelengths are the odd harmonics (λ/3, λ/5, λ/7 . . . ) of the original square wave frequency, λ. FIG. 25A shows a square wave plot. The Fourier transform of a perfect square wave, as represented in FIG. 25A, is shown in FIG. 25B. Note, the strength of the DC component or the 0 frequency point is half the intensity of the bright section of the input square wave. The DC component is equivalent to Ao/2, where Ao is the peak to peak intensity (that is, 2× the amplitude) of the input square wave. Likewise the strength of the fundamental frequency or first harmonic is, 4Ao/π. In accordance with the equation for the Fourier series expansion seen below, the strength of each additional harmonic is 1/N the strength of the fundamental frequency. For example, the contribution of the 5th harmonic is ⅕ that of the fundamental frequency.

Fourier Series Expansion for Square Wave is given by the following formula:

$$f(x)=Ao/2+4Ao/\pi(\sin kx+⅓ \sin 3kx+⅕ \sin 5kx+\ldots).$$

The MTF of a real optical system may now be measured. Using discrete Fast Fourier Transform (FFT) techniques, the Fourier transform of a relatively low spatial frequency bar pattern may be determined. The strength of each of the components of the bar pattern can be quantified. It should be noted that each of the components is really one of the constituent sinusoids that comprise the square wave. Each component can be divided by the strength of the components from the Fourier transform of the perfect square wave as shown in FIG. 25B. Degradation between real cases and perfect cases comprises the modulation loss created by the optical and electronic imaging systems. A perfect optical system that suffers no loss in modulation from diffraction, aberrations, manufacturing tolerances or signal processing should reproduce the square wave pattern perfectly in the image plane. In this case, the FFT would produce a plot identical to that shown in FIG. 25B. It should also be noted that a perfect optical system is an impossibility primarily due to diffraction effects. Therefore, it is common practice to call the perfect optical system a diffraction limited. A plot of the ratios of the strengths of each of the constituent harmonic frequencies is really a plot of the MTF of the system. Therefore, if a relatively low frequency square wave is used as the input waveform in the object plane, one could quantify the modulation of numerous frequencies out to the cutoff frequency.

One of the true strengths of the method of the invention lies in the ability to use classically undersampled detectors to determine the MTF well beyond the Nyquist sampling frequency. In this case, the higher order harmonics are present in the FFT, however, they appear as foldback peaks. These peaks fold back from the sampling frequency back onto the original harmonics. Therefore, a fundamental frequency may be chosen in conjunction with a sampling frequency to allow the foldback frequencies to appear in between the lower order harmonics. The sampling frequency may be advantageously determined by the cameras pixel size. With this method, the MTF may be determined well beyond the sampling frequency of the detector.

Figure 26:
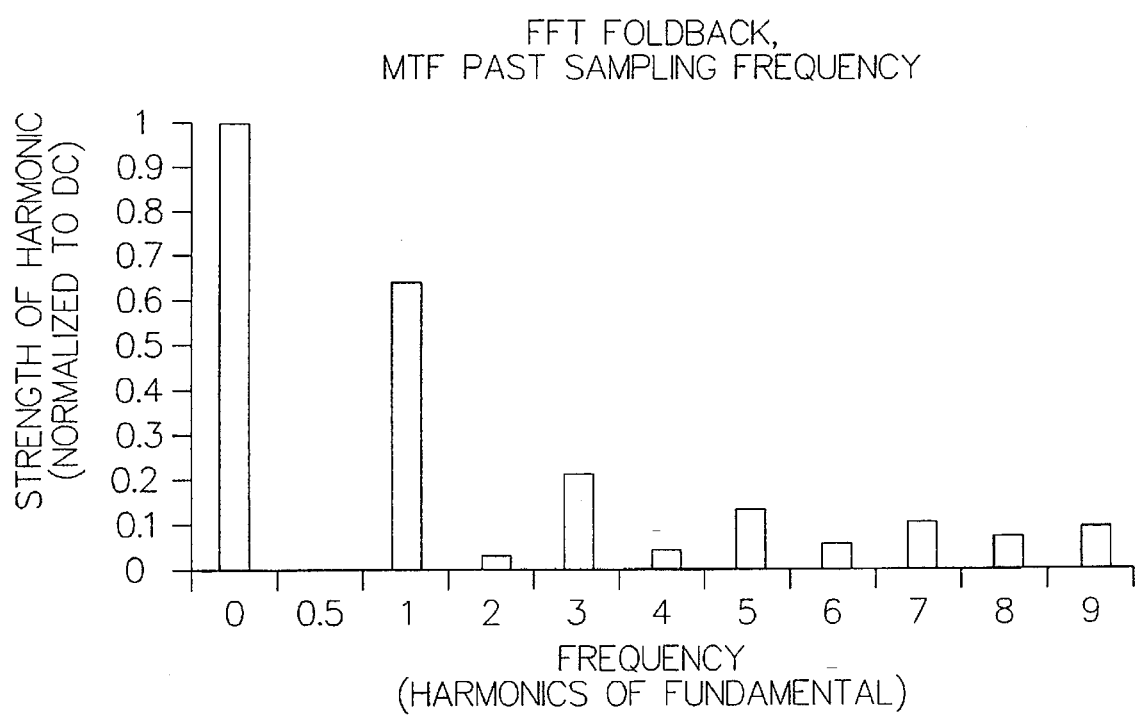
FIG. 26 Shows one example of an FFT foldback for MTF determination beyond the detector sampling frequency.

FIG. 26 shows one example of an FFT foldback for MTF determination beyond the detector sampling frequency. Note, in this example, the sampling frequency of the detector was equal to a frequency of 9.5 times the fundamental. Therefore the higher harmonics, 11th, 13th etc., folded back into the location of the (missing) even harmonics. Note, that the strength of these harmonics is equal to the strength of the harmonics seen in FIG. 25B.

These techniques were employed to measure the MTF of an actual imaging system. The results are shown in Tables 8 and 9. Note the plots give the MTF at three locations in the field of view for each direction. A vertical bar pattern with a line frequency of 50 lp/mm was used to determine the horizontal MTF. Likewise, a horizontal bar pattern was used for determination of vertical MTF. The optical system comprised a microscope objective with 20X magnification, 0.75 NA collection aperture and 0.45 NA illumination aperture. The camera pixel size was 11 microns in the image plane and 0.55 microns (11 microns /20X) in the object plane. The data is given for MTF in the object plane. This test was taken during operation of an automated cytological imaging and analysis system by intercepting the optical path with a glass target simulating a microscope slide with horizontal and vertical 50 lp/mm targets.

TABLE 8

Vertical MTF
20X Vertical MTF for Three Portions of Field of View

| Freq Range | | Left | | | Right | | | Right | | |
|---|---|---|---|---|---|---|---|---|---|---|
| min | max | freq | mtf | min | freq | mtf | min | freq | mtf | min |
| .0 | 0 | 0 | 0.951 | 0.839 | 0 | 0.939 | 0.839 | 0 | 0.937 | 0.839 |
| 48.0 | 52 | 49.7 | 0.951 | 0.91 | 49.7 | 0.95 | 0.91 | 49.7 | 0.953 | 0.91 |
| 144.0 | 156 | 149.1 | 0.924 | 0.87 | 149.1 | 0.925 | 0.87 | 149.1 | 0.928 | 0.87 |
| 240.0 | 260 | 248.5 | 0.885 | 0.819 | 248.5 | 0.885 | 0.819 | 248.5 | 0.893 | 0.819 |
| 336.0 | 364 | 348 | 0.845 | 0.75 | 348 | 0.84 | 0.75 | 348 | 0.85 | 0.75 |
| 432.0 | 468 | 447.4 | 0.799 | 0.66 | 447.4 | 0.798 | 0.66 | 447.4 | 0.803 | 0.66 |
| 528.0 | 572 | 546.8 | 0.76 | 0.55 | 550.4 | 0.743 | 0.55 | 550.4 | 0.756 | 0.55 |
| 624.0 | 676 | 649.8 | 0.675 | 0.449 | 649.8 | 0.683 | 0.449 | 649.8 | 0.698 | 0.449 |
| 730.0 | 780 | 749.2 | 0.607 | 0.349 | 749.2 | 0.623 | 0.349 | 749.2 | 0.632 | 0.349 |
| 816.0 | 884 | 848.7 | 0.545 | 0.250 | 848.7 | 0.542 | 0.259 | 848.7 | 0.549 | 0.259 |

TABLE 9

Horizontal MTF
20X Horizontal MTF for Three Portions of Field of View

| Freq Range | | Left | | | Center | | | Right | | |
|---|---|---|---|---|---|---|---|---|---|---|
| min | max | freq | mtf | min | freq | mtf | min | freq | mtf | min |
| .0 | 0 | 0 | 0.953 | 0.839 | 0 | 0.955 | 0.839 | 0 | 0.95 | 0.839 |
| 48.0 | 52 | 49.7 | 0.928 | 0.899 | 49.7 | 0.925 | 0.899 | 49.7 | 0.926 | 0.899 |
| 144.0 | 156 | 149.1 | 0.813 | 0.769 | 149.1 | 0.809 | 0.769 | 149.1 | 0.811 | 0.760 |
| 240.0 | 260 | 248.5 | 0.659 | 0.61 | 248.5 | 0.654 | 0.61 | 248.5 | 0.658 | 0.61 |
| 336.0 | 364 | 348 | 0.516 | 0.449 | 348 | 0.512 | 0.449 | 348 | 0.51 | 0.449 |
| 432.0 | 468 | 447.4 | 0.397 | 0.319 | 447.4 | 0.396 | 0.319 | 447.4 | 0.391 | 0.319 |
| 528.0 | 572 | 546.8 | 0.31 | 0.219 | 546.8 | 0.302 | 0.219 | 546.8 | 0.303 | 0.219 |
| 624.0 | 676 | 646.8 | 0.239 | 0.129 | 649.8 | 0.238 | 0.129 | 649.8 | 0.232 | 0.129 |
| 730.0 | 780 | 749.2 | 0.183 | 0 | 749.2 | 0.185 | 0 | 749.2 | 0.18 | 0 |
| 816.0 | 884 | 848.7 | 0.15 | 0 | 848.7 | 0.158 | 0 | 848.7 | 0.154 | 0 |

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automated focus illumination test to check illumination quality for a machine vision system including at least two focus cameras, the automated focus illumination test comprising the steps of:

a) taking an image of a clear field for each camera;

b) measuring illumination characteristics including mean illumination levels for each of the at least two cameras;

c) checking a ratio of mean illumination levels between the at least two cameras against limits; and d) checking a coefficient of variation of an illumination distribution for each camera against limits.

2. The automated focus illumination test of claim 1 wherein the at least two focus cameras further comprise a plus focus camera and a minus focus camera.

3. The automated focus illumination test of claim 1 wherein step (a) taking an image of a clear field for each camera further comprises developing a histogram of image data from the image of the clear field.

4. The automated focus illumination test of claim 1 wherein step (b) measuring illumination characteristics further comprises determining a near illumination level.

5. The automated focus illumination test of claim 1 wherein step (b) measuring illumination characteristics further comprises determining a coefficient of variation for each of the at least two cameras.

6. The automated focus illumination test of claim 1 wherein the automated focus illumination test further comprises the steps of:
 (a) checking a mean illumination level for each of the at least two focus cameras against limits; and
 (b) checking a coefficient of variation for each of the at least two focus cameras against limits.

* * * * *

UNITED STATES PATENT AND TRADEMARK OFFICE
CERTIFICATE OF CORRECTION

PATENT NO. : 5,654,535
DATED : August 5, 1997
INVENTOR(S) : Ortyn et al.

It is certified that error appears in the above-identified patent and that said Letters Patent is hereby corrected as shown below:

Column 1, line 60, after the word "above" insert -- and --.

Column 1, line 64, after the word "above" insert -- and --.

Column 2, line 27, after the word "in" insert -- an --.

Column 6, line 7, delete the word "locus" and replace it with -- focus --.

Column 7, line 27, after the word "is" delete the ",".

Column 8, line 44, after the word "tioning" delete the "."

Column 8, line 44, delete the word "my" and replace it with -- may --.

Column 8, line 46, delete the word "o" and replace it with -- of --.

Column 9, line 7, delete the word "them" and replace it with -- the --.

Column 10, line 3, delete the second occurrence of the word "of".

Column 11, line 45, delete the word "a".

Column 11, line 61, delete the "-" and replace it with -- + --.

Column 13, line 20, after the word "content" delete the ",".

Column 13, line 48, delete the phrase "focus-video" and replace it with
-- focus- video --.

UNITED STATES PATENT AND TRADEMARK OFFICE
CERTIFICATE OF CORRECTION

PATENT NO. : 5,654,535
DATED : August 5, 1997
INVENTOR(S) : Ortyn et al.

It is certified that error appears in the above-identified patent and that said Letters Patent is hereby corrected as shown below:

Column 14, line 40, please delete the phrase "system. This" and replace it with -- system, this --.

Column 14, line 45, please delete the word "on" and replace it with -- one --.

Column 15, line 2, after the word "point" delete the ",".

Column 15, line 56, delete number "50" and replace it with -- 504 --.

Column 16, line 62, after the word "and" insert -- an --.

Column 18, line 33, delete the word "o" and replace it with -- or --.

Column 20, line 17, delete the word "a".

Column 21, line 6, delete the phrase "increases the," and replace it with -- increases, the --.

Table 8 at Columns 23 and 24, in the table heading, delete the first occurrence of the word "Right" and replace it with -- Center --.

Table 9 at Columns 23 and 24, in the last column of numbers, 3rd from the top, delete number "0.760" and replace it with -- 0.769 --.

UNITED STATES PATENT AND TRADEMARK OFFICE
CERTIFICATE OF CORRECTION

PATENT NO. : 5,654,535
DATED : August 5, 1997
INVENTOR(S) : Ortyn et al.

It is certified that error appears in the above-identified patent and that said Letters Patent is hereby corrected as shown below:

Column 23, line 44, delete the word "cameras" and replace it with -- camera's --.

Signed and Sealed this

Ninth Day of February, 1999

Attest:

*Acting Commissioner of Patents and Trademarks*

*Attesting Officer*